US010967359B2

(12) United States Patent
Wendland et al.

(10) Patent No.: US 10,967,359 B2
(45) Date of Patent: Apr. 6, 2021

(54) POLYMERIC SORBENTS FOR REACTIVE GASES

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 373 days.

(21) Appl. No.: 15/781,557

(22) PCT Filed: Dec. 15, 2016

(86) PCT No.: PCT/US2016/066823
§ 371 (c)(1),
(2) Date: Jun. 5, 2018

(87) PCT Pub. No.: WO2017/106438
PCT Pub. Date: Jun. 22, 2017

(65) Prior Publication Data
US 2020/0261884 A1  Aug. 20, 2020

Related U.S. Application Data

(60) Provisional application No. 62/269,626, filed on Dec. 18, 2015.

(51) Int. Cl.
*B01D 53/02* (2006.01)
*B01J 20/26* (2006.01)
*C08F 8/32* (2006.01)
*C08F 222/08* (2006.01)
*B01J 20/28* (2006.01)

(52) U.S. Cl.
CPC ............ *B01J 20/264* (2013.01); *B01D 53/02* (2013.01); *B01J 20/265* (2013.01); *C08F 8/32* (2013.01); *C08F 222/08* (2013.01); *B01D 2253/202* (2013.01); *B01D 2257/302* (2013.01); *B01J 20/28061* (2013.01); *B01J 20/28071* (2013.01)

(58) Field of Classification Search
CPC .... C08F 212/36; C08F 212/08; C08F 222/06; C08F 222/08; B01D 2253/202; B01D 2253/306; B01D 2253/311; B01D 2257/202; B01D 2257/204; B01D 2257/302; B01D 2257/304; B01D 2257/402; B01D 53/02; B01J 20/264; B01J 20/265; B01J 20/28057; B01J 20/28061; B01J 20/28069; B01J 20/28071; Y02C 20/10; Y02P 20/151
See application file for complete search history.

(56) References Cited

U.S. PATENT DOCUMENTS

| 3,799,870 | A | 3/1974 | Heilweil |
| 4,273,751 | A | 6/1981 | Sinha |
| 4,443,354 | A | 4/1984 | Eian |
| 4,677,096 | A | 6/1987 | Van der Smissen |
| 5,507,848 | A * | 4/1996 | Beckman ............... B01J 20/26 55/522 |
| 6,930,219 | B2 | 8/2005 | Shan |
| 7,559,981 | B2 | 7/2009 | Friday |
| 8,470,074 | B2 | 6/2013 | Baugh |
| 9,776,131 | B2 | 10/2017 | Eisenberger |
| 2007/0154348 | A1* | 7/2007 | Frutos ............. G01N 33/54353 422/400 |
| 2008/0319097 | A1 | 12/2008 | Johannsen |
| 2009/0060809 | A1 | 3/2009 | Shioya |
| 2012/0052580 | A1* | 3/2012 | Pai ...................... C12N 5/0068 435/396 |
| 2014/0186250 | A1 | 7/2014 | Levan |
| 2017/0333870 | A1 | 11/2017 | Wendland |
| 2020/0298170 | A1* | 9/2020 | Wendland ......... B01D 39/1623 |

FOREIGN PATENT DOCUMENTS

| JP | S48-070690 A | 9/1973 |
| WO | WO 2003/064478 A | 8/2003 |
| WO | WO 2011/035195 | 3/2011 |
| WO | WO 2015/095110 | 6/2015 |
| WO | WO 2015/095115 | 6/2015 |
| WO | WO 2016/186858 | 11/2016 |

(Continued)

OTHER PUBLICATIONS

Arean, "Carbon dioxide and nitrogen adsorption on porous copolymers of divinylbenzene and acrylic acid", Adsorption, Apr. 2013, vol. 19, No. 2-4, pp. 367-372.
Bicak, "Aldehyde Separation by Polymer-Supported Oligo (ethyleneimines)", Journal of Polymer Science: Part A: Polymer Chemistry, Jul. 1997, vol. 35, No. 14, pp. 2857-2864, XP55027595.
Bottcher, "Silica Sol-Gel Glasses with Embedded Organic Liquids", Advanced Materials, Feb. 1999, vol. 11, No. 2, pp. 138-141.
Carta, "Novel Spirobisindanes for Use as Precursors to Polymers of Intrinsic Microporosity", Organic Letters, 2008, vol. 10, No. 13, pp. 2641-2643.
Cecile, "Hydrophilic Polystyrene/Maleic Anhydride Ultrafine Fibrous Membranes", Journal of Applied Polymer Science, Jan. 2010, vol. 115, No. 2, pp. 723-730.

(Continued)

*Primary Examiner* — Christopher P Jones
(74) *Attorney, Agent, or Firm* — Jean A. Lown

(57) ABSTRACT

Polymeric sorbents for reactive gases are provided. More particularly, the polymeric sorbents are a reaction product of a divinylbenzene/maleic anhydride precursor polymeric material with a nitrogen-containing compound. The polymeric sorbent has nitrogen-containing groups that are covalently attached to the polymeric sorbent. The nitrogen-containing groups include a primary amino group, a secondary amino group, a tertiary amino group, or a combination thereof. Additionally, methods of sorbing reactive gases on the polymeric sorbents and compositions resulting from the sorption of reactive gases on the polymeric sorbents are provided.

11 Claims, 2 Drawing Sheets

(56) References Cited

FOREIGN PATENT DOCUMENTS

| WO | WO 2016/205083 | 12/2016 |
|---|---|---|
| WO | WO 2016/205444 | 12/2016 |
| WO | WO 2017/106434 | 6/2017 |
| WO | WO 2017/106443 | 6/2017 |
| WO | WO 2017/160650 | 9/2017 |

OTHER PUBLICATIONS

Chen, "Stability and Equilibrium Properties of Macroreticular Resins for Flue Gas Desulfurization", Industrial and Engineering Chemistry Research, 1990, vol. 29, No. 3, pp. 440-447, XP055356157.

Chowdhury, "Synthesis and characterization of radiation grafted films for removal of arsenic and some heavy metals from contaminated water", Radiation Physics and Chemistry, Oct. 2012, vol. 81, No. 10, pp. 1606-1611.

Croll, "Formation of Tectocapsules by Assembly and Cross-linking of Poly(divinylbenzene-alt-maleic anhydride) Spheres at the Oil-Water Interface", Langmuir, May 2003, vol. 19, No. 14, pp. 5918-5922, XP055355244.

Gorka, "KOH activation of mesoporous carbons obtained by soft-templating", Carbon, Jul. 2008, vol. 46, No. 8, pp. 1159-1161.

Harada, "Removal of primary and secondary amines by reaction gas chromatography using porous maleic anhydride—divinylbenzene copolymer beads", Pharmaceutical Science Department, Kumamoto University, Jul. 1982, vol. 31, pp. 697-701.

Kaliva, "Microporous Polystyrene Particles for Selective Carbon Dioxide Capture", Langmuir, Feb. 2012, vol. 28, No. 5, pp. 2690-2695.

Niu, "Highly dispersed Ru on K-doped meso-macroporous $SiO_2$ for the preferential oxidation of CO in $H_2$-rich gases", International Journal of Hydrogen Energy, 2014, vol. 39, No. 25, pp. 13800-13807.

Ogawa, "Preparation of Spherical Polymer Beads of Maleic Anhydride-Styrene-Divinylbenzene and Metal Sorption of its Derivatives", Journal of Applied Polymer Science, 1984, vol. 29, No. 9, pp. 2851-2856.

Okay, "Porous Maleic Anhydride-Styrene-Divinylbenzene Copolymer Beads", Journal of Applied Polymer Science, Jul. 1987, vol. 34, pp. 307-317, XP055356037.

Song, "Coordination of Metal Cations with Amino-Functionalized MCM-41 for Adsorptive Desulfurization", Advanced Materials Research, 2014, vols. 926-930, pp. 4222-4225.

Woodward, "Swellable, Water- and Acid-Tolerant Polymer Sponges for Chemoselective Carbon Dioxide Capture", Journal of the American Chemical Society, 2014, vol. 136, No. 25, pp. 9028-9035.

Yan, "In situ growth of a carbon interphase between carbon fibres and a polycarbosilane-derived silicon carbide matrix", Carbon, 2011, vol. 49, No. 8, pp. 2869-2877.

Yang, "A Pervaporation Study of Ammonia Solutions Using Molecular Sieve Silica Membranes", Membranes, 2014, vol. 4, No. 1, pp. 40-54.

Yim, "Removal of Formaldehyde Over Amine Functionalized SBA-15", Journal of Nanoscience and Nanotechnology, 2011, vol. 11, No. 2, pp. 1714-1717.

International Search Report for PCT International Application No. PCT/US2016/066823, dated Mar. 28, 2017, 5 pages.

\* cited by examiner

POLYMERIC SORBENTS FOR REACTIVE GASES

CROSS REFERENCE TO RELATED APPLICATIONS

This application is a national stage filing under 35 U.S.C. 371 of PCT/US2016/066823, filed Dec. 15, 2016, which claims the benefit of U.S. Provisional Application No. 62/269,626, filed Dec. 18, 2015, the disclosure of which is incorporated by reference in its/their entirety herein.

TECHNICAL FIELD

Polymeric sorbents for reactive gases, methods of making the polymeric sorbents, methods of sorbing reactive gases on polymeric sorbents, and compositions resulting from the sorption of reactive gases on the polymeric sorbents are provided.

BACKGROUND

A typical sorbent material that has been used for capturing reactive gases such as acid gases and/or acid precursor gases is based on an activated carbon scaffold. The activated carbon scaffold tends to be relatively inactive and this inactivity makes it difficult to incorporate into the activated carbon scaffold itself a large number of groups capable of sorbing the reactive gases. For this reason, most of the efforts in making sorbents for acid gases and/or acid precursor gases have been focused on finding impregnation chemistries that can react with the acid. Thus, the activated carbon scaffolds are typically impregnated with various basic compounds. The most commonly used basic compounds are potassium carbonate, sodium hydroxide and potassium hydroxide.

Impregnation in general has some drawbacks for making sorbents materials. The impregnation chemistries can migrate and this is problematic especially if other sorbents are used in the same product.

SUMMARY

Polymeric sorbents for reactive gases are provided. More particularly, the polymeric sorbents are a reaction product of a divinylbenzene/maleic anhydride precursor polymeric material with a nitrogen-containing compound. The polymeric sorbent has nitrogen-containing groups that can undergo an acid-base reaction with the reactive gases, which are acid gases, acid gas precursors, or both. Additionally, methods of sorbing reactive gases on the polymeric sorbents and compositions resulting from the sorption of reactive gases on the polymeric sorbents are provided.

In a first aspect, a polymeric sorbent is provided. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia or a compound having at least one primary amino group or at least one secondary amino group.

In a second aspect, a method of sorbing a reactive gas on a polymeric sorbent is provided. The method includes providing a polymeric sorbent as described above and sorbing the reactive gas on the polymeric sorbent. The reactive gas is an acid gas, an acid gas precursor, or both.

In a third aspect, a composition is provided that includes (a) a polymeric sorbent as described above and (b) a reactive gas sorbed on the polymeric sorbent. The reactive gas is an acid gas, an acid gas precursor, or both.

In a fourth aspect, a method of preparing a polymeric sorbent is provided. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia or a compound having at least one primary amino group or at least one secondary amino group.

DETAILED DESCRIPTION

Figure 1:
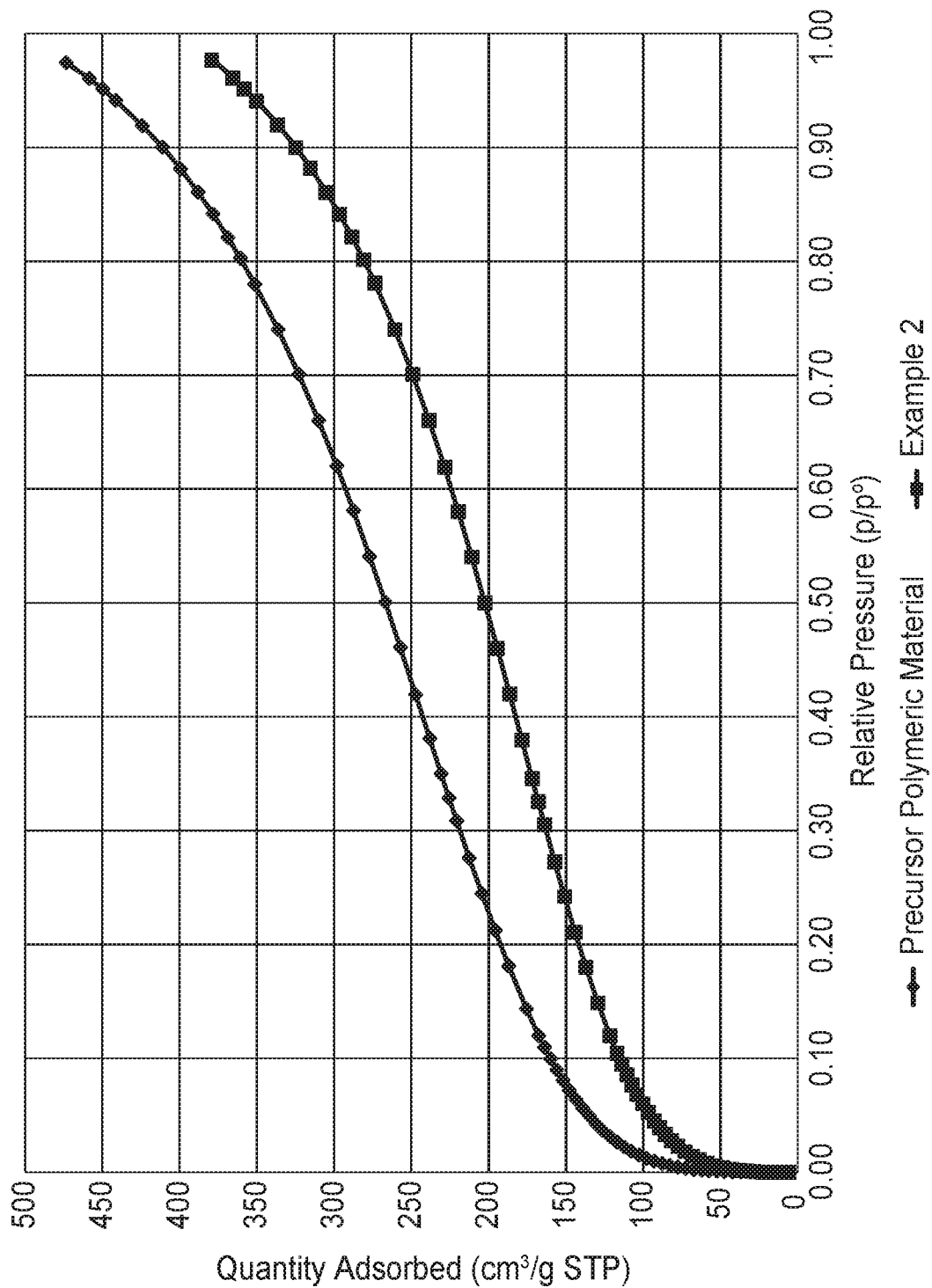
FIG. 1 is the argon adsorption isotherms at 77° K and at relative pressures up to 0.98±0.01 for the polymeric sorbent of Example 2 and the precursor polymeric material from which it was prepared.

Polymeric sorbents are provided. The polymeric sorbents can be used to sorb reactive gases such as an acid gas, acid gas precursor, or both. Additionally, methods of making the polymeric sorbents, methods of sorbing reactive gases on the polymeric sorbents, and compositions resulting from sorption of reactive gases on the polymeric sorbents are provided. The polymeric sorbents typically are porous, with the pores often being in the size range of mesopores and/or micropores.

More particularly, the polymeric sorbents are a reaction product of a divinylbenzene/maleic anhydride precursor polymeric material with a nitrogen-containing compound. The polymeric sorbent has covalently attached nitrogen-containing groups. The polymeric sorbent can be used to sorb reactive gases. The reactive gases typically undergo an acid-base reaction with the nitrogen-containing groups of the polymeric sorbent.

The terms "a", "an", and "the" are used interchangeably with "at least one" to mean one or more of the elements being described.

The term "and/or" means either or both. For example "A and/or B" means only A, only B, or both A and B.

The terms "polymer" and "polymeric material" are used interchangeably and refer to materials formed by reacting one or more monomers. These terms include homopolymers, copolymers, terpolymers, or the like. Likewise, the terms "polymerize" and "polymerizing" refer to the process of making a polymeric material that can be a homopolymer, copolymer, terpolymer, or the like.

The terms "polymeric sorbent" and "porous polymeric sorbent" are used interchangeably to refer to a polymeric material that is porous and that can sorb gaseous substances such as, for example, reactive gases. Porous materials such as the polymeric sorbents can be characterized based on the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers. The porosity of a polymeric sorbent can be characterized from an adsorption isotherm of an inert gas such as nitrogen or argon by the porous material under cryogenic conditions (e.g., liquid nitrogen at 77° K). The adsorption isotherm is typically obtained by measuring adsorption of the inert gas such as argon by the porous polymeric sorbent at multiple relative pressures in a range of about $10^{-6}$ to about 0.98±0.01. The isotherms are then analyzed using various methods such as the BET (Brunauer-Emmett-Teller) method to calculate specific surface area and such as the Density Functional Theory (DFT) to characterize the porosity and the pore size distribution.

The term "sorbing" and similar words such as "sorb", "sorbed", and "sorption" refer to the addition of a first substance (e.g., a gas such as a reactive gas) to a second substance (e.g., a polymeric material such as the porous polymeric sorbent) by adsorbing, absorbing, or both. Likewise, the term "sorbent" refers to a second substance that sorbs a first substance by adsorbing, absorbing, or both.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen at 77° K) over a range of relative pressures. The term "BET specific surface area" is the surface area per gram of a material (typically, $m^2$/gram) that is usually calculated from adsorption isotherm data of the inert gas over a relative pressure range of 0.05 to 0.30 using the BET method.

The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material.

The term "monomer mixture" refers to that portion of a polymerizable composition that includes the monomers. More specifically, as used herein, the monomer mixture includes at least divinylbenzene and maleic anhydride.

The terms "divinylbenzene/maleic anhydride polymeric material" and "divinylbenzene/maleic anhydride precursor polymeric material" are used interchangeably and refer to a polymeric material prepared from divinylbenzene, maleic anhydride, and optionally a styrene-type monomer.

The term "styrene-type monomer" refers to styrene, an alkyl substituted styrene (e.g., ethyl styrene), or mixtures thereof. These monomers are often present in divinylbenzene as impurities.

The term "reactive gas" refers to an acid gas, an acid gas precursor, or both.

The term "acid gas" refers to a gas or vapor that contains an acidic compound. In many embodiments, the acid gas contains a halogen atom, a nitrogen atom, or a sulfur atom. Examples of acid gases include hydrogen fluoride, hydrogen bromide, hydrogen chloride, sulfuric acid, sulfurous acid, hydrogen sulfide, nitric acid, and nitrous acid.

The term "acid gas precursor" refers to a gas or vapor that contains a compound that reacts with water to form an acidic compound. In many embodiments, the acid gas precursor contains a halogen atom, a nitrogen atom, or a sulfur atom. Examples of acid gas precursors include fluorine, bromine, chlorine, sulfur dioxide, and nitrogen dioxide.

The term "primary amino group" refers to the amino group —$NH_2$.

The term "secondary amino group" refers to an amino group of formula —$NHR_8$ where $R_8$ is an alkyl. Suitable alkyl groups typically have 1 to 20 carbon atoms, 1 to 10 carbon atoms, 1 to 6 carbon atoms, or 1 to 4 carbon atoms.

The term "tertiary amino group" refers to an amino group of formula —$NR_8R_8$ where each $R_8$ is an alkyl. Suitable alkyl groups typically have 1 to 20 carbon atoms, 1 to 10 carbon atoms, 1 to 6 carbon atoms, or 1 to 4 carbon atoms.

The term "room temperature" refers to a temperature in a range of 20° C. to 30° C., in a range of 20° C. to 25° C., in a range close to and including 25° C., or 25° C.

In a first aspect, a polymeric sorbent is provided. The porous polymeric sorbent is formed by reacting a precursor polymeric material with a nitrogen-containing compound. The precursor polymeric material is formed from divinylbenzene, maleic anhydride, and an optional styrene-type monomer. The precursor polymeric material can be referred to as a divinylbenzene/maleic anhydride polymeric material. The conditions used to synthesize the precursor polymeric material are selected to produce a polymeric sorbent that has a BET specific surface area equal to at least 25 $m^2$/gram. The nitrogen-containing compound reacts with an anhydride group in the precursor polymeric material. This reaction results in the formation of the polymeric sorbent that has a covalently attached nitrogen-containing group. That is, the nitrogen-containing group is part of the polymeric sorbent.

The precursor polymeric material (i.e., the divinylbenzene/maleic anhydride polymeric material) is synthesized from a polymerizable composition that includes a monomer mixture containing maleic anhydride, divinylbenzene, and an optional styrene-type monomer. More specifically, the precursor polymeric material is formed from a monomer mixture containing 1) 8 to 65 weight percent maleic anhydride, 2) 30 to 85 weight percent divinylbenzene, and 3) 0 to 40 weight percent of a styrene-type monomer, wherein the styrene-type monomer is styrene, an alkyl substituted styrene, or a combination thereof. The amounts are based on the total weight of monomers in the monomer mixture, which is equal to the total weight of monomers in the polymerizable composition. When the precursor polymeric material is used to form a polymeric sorbent that is particularly effective for sorption of reactive gases, the monomer mixture often contains 1) 15 to 65 weight percent maleic anhydride, 2) 30 to 85 weight percent divinylbenzene, and 3) 0 to 40 weight percent of a styrene-type monomer, wherein the styrene-type monomer is styrene, an alkyl substituted styrene, or a combination thereof.

The maleic anhydride that is included in the monomer mixture results in the formation of maleic anhydride monomeric units of Formula (I) within the precursor polymeric material.

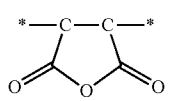

(I)

The asterisks in this formula and other formulas contained herein denote the location of attachment of the monomeric unit to another monomeric unit or to a terminal group.

The amount of maleic anhydride used to form the precursor polymeric material influences the amount of nitrogen-containing compound that can react with the precursor polymeric material to form the polymeric sorbent. The nitrogen-containing compound reacts with the anhydride group to become covalently attached to the polymeric material that is the polymeric sorbent.

In some embodiments, the amount of maleic anhydride included in the monomer mixture is at least 8 weight percent, at least 10 weight percent, at least 12 weight percent, at least 15 weight percent, or at least 20 weight percent. The amount of maleic anhydride can be up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent. For example, the maleic anhydride may be present in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (I) in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. These amounts are based on the total weight of the monomeric units in the precursor polymeric material.

The divinylbenzene included in the monomer mixture results in the formation of divinylbenzene monomeric units of Formula (II) within the precursor polymeric material.

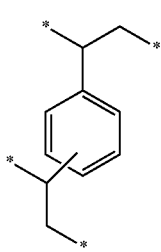

(II)

The two groups attached to the benzene ring can be in an ortho, meta, or para arrangement to each other. The monomeric units of Formula (II) contribute to the high crosslink density and to the formation of a rigid polymeric material having micropores and/or mesopores.

The amount of divinylbenzene used to form the precursor polymeric material can have a strong influence on the BET specific surface area of both the precursor polymeric material and the polymeric sorbent. The BET specific surface area tends to increase with an increase in the amount of divinylbenzene in the monomer mixture used to form the precursor polymeric material and with the resulting amount of monomeric units of Formula (II) in the polymeric sorbent. If the amount of divinylbenzene is less than 30 weight percent, the polymeric sorbent may not have a sufficiently high BET specific surface area. On the other hand, if the amount of divinylbenzene is greater than 85 weight percent, the amount of reactive gas sorbed may be compromised because there are fewer nitrogen-containing groups in the polymeric sorbent. In some embodiments, the amount of divinylbenzene included in the monomer mixture is at least 30 weight percent, at least 35 weight percent, at least 40 weight percent, or at least 45 weight percent. The amount of divinylbenzene can be up to 85 weight percent, up to 80 weight percent, up to 75 weight percent, up to 70 weight percent, up to 65 weight percent, up to 60 weight percent, or up to 50 weight percent. For example, the amount can be in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (II) in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. These amounts are based on the total weight of the monomeric units in the precursor polymeric material.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl substituted styrene (e.g., ethyl styrene), or mixtures thereof. Thus, styrene-type monomers are often present along with divinylbenzene and maleic anhydride in the monomer mixture contained in the polymerizable composition used to form the precursor polymeric material. The monomer mixture typically contains 0 to 40 weight percent styrene-type monomers based on the total weight of monomers in the monomer mixture. If the content of the styrene-type monomer is greater than 40 weight percent, the crosslink density may be too low and/or the distance between crosslinks may be too large to provide a polymeric sorbent with the desired BET specific surface area (e.g., at least 25 $m^2$/grams). As the crosslink density decreases, the polymeric sorbent tends to be less rigid and less porous. Typically, divinylbenzene having a purity of 55 weight percent is not suitable for use in the monomer mixtures used to form the precursor polymeric material because the content of styrene-type monomer impurities is too high. That is, to provide a monomer mixture having a minimum amount of divinylbenzene, the divinylbenzene often is at least about 80 weight percent pure. Using divinylbenzene having a lower purity than about 80 weight percent can result in the formation of a precursor polymeric material and/or a polymeric sorbent with an undesirably low BET specific surface area.

The styrene-type monomers included in the monomer mixture result in the presence of styrene-type monomeric units of Formula (III) within the precursor polymeric material.

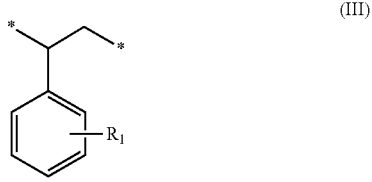

(III)

Group $R_1$ is hydrogen or alkyl (e.g., an alkyl having 1 to 10 carbon atoms, 1 to 6 carbon atoms or 1 to 4 carbon atoms).

In some embodiments, the amount of styrene-type monomers used to form the precursor polymeric material is at least 1 weight percent, at least 2 weight percent, or at least 5 weight percent. The amount of styrene-type monomers can be up to 40 weight percent, up to 30 weight percent, up to 20 weight percent, or up to 10 weight percent. For example, the amount can be in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. The amounts are based on the total weight of monomers in the monomer mixture contained in the polymerizable composition used to form the precursor polymeric material.

Stated differently, the precursor polymeric material contains monomeric units of Formula (III) in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. These amounts are based on the total weight of the monomeric units in the precursor polymeric material.

Overall, the precursor polymeric material is formed from a polymerizable composition containing a monomer mixture that includes 8 to 65 weight percent maleic anhydride, 30 to 85 weight percent divinylbenzene, and 0 to 40 weight percent of a styrene-type monomer. In some embodiments, the monomer mixture contains 15 to 65 weight percent maleic anhydride, 30 to 85 weight percent divinylbenzene, and 0 to 40 weight percent (or 5 to 40 weight percent) of a styrene-type monomer. Some embodiments contain 25 to 65 weight percent maleic anhydride, 30 to 75 weight percent divinylbenzene, and 1 to 20 weight percent (or 5 to 20 weight percent) styrene-type monomer. Some embodiments contain 25 to 60 weight percent maleic anhydride, 30 to 75 weight percent divinylbenzene, and 1 to 30 weight percent (or 5 to 30 weight percent or 10 to 30 weight percent) styrene-type monomer. In still other embodiments, the monomer mixture contains 30 to 65 weight percent maleic anhydride, 30 to 70 weight percent divinylbenzene, and 1 to 20 weight percent (or 5 to 20 weight percent or 10 to 20 weight percent) styrene-type monomer. In still other embodiments, the monomer mixture contains 30 to 60 weight percent maleic anhydride, 30 to 65 weight percent divinylbenzene, and 1 to 20 weight percent (or 5 to 20 weight percent or 10 to 20 weight percent) styrene-type monomer. In further embodiments, the monomer mixture contains 40 to 60 weight percent maleic anhydride, 30 to 55 weight percent divinylbenzene, and 1 to 20 weight percent (or 5 to 20 weight percent, or 10 to 20 weight percent) styrene-type monomers. In still further embodiments, the monomer mixture contains 20 to 40 weight percent maleic anhydride, 50 to 70 weight percent divinylbenzene, and 1 to 20 weight percent (or 5 to 20 weight percent or 10 to 20 weight percent) styrene-type monomer. The weight percent values are based on the total weight of monomers in the monomer mixture used to form the precursor polymeric material.

The monomer mixture included in the polymerizable composition used to form the precursor polymeric material typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, at least 99.9 weight percent, or 100 weight percent of the monomers in the monomer mixture are selected from maleic anhydride, divinylbenzene, and styrene-type monomer. In some embodiments, where high purity divinylbenzene is used, the monomer mixture contains only divinylbenzene and maleic anhydride. That is, the sum of the amount of divinylbenzene and maleic anhydride is 100 weight percent.

In addition to the monomer mixture, the polymerizable composition used to form the precursor polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the precursor polymeric material as it begins to form. The organic solvent typically includes a ketone, ester, acetonitrile, or mixture thereof.

The organic solvent can function as a porogen during the formation of the precursor polymeric material. The organic solvent choice can strongly influence the BET specific surface area and the size of the pores formed in the precursor polymeric material. Using organic solvents that are miscible with both the monomers and the forming polymer tends to result in the formation of micropores and mesopores within the precursor polymeric material. Good solvents for the monomers and the forming polymer tend to result in a larger fraction of the porosity of the final polymeric sorbent being in the form of micropores and mesopores.

Organic solvents that are particularly suitable include ketones, esters, acetonitrile, and mixtures thereof. Provided that the resulting precursor polymeric material has a BET specific surface area equal to at least 100 $m^2$/gram, other organic solvents can be added along with one or more of these organic solvents. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 75 weight percent (i.e., the polymerizable composition contains 25 to 99 weight percent organic solvent). If the percent solids are too low, the polymerization time may become undesirably long. The percent solids are often at least 1 weight percent, at least 2 weight percent, at least 5 weight percent, at least 10 weight percent, or at least 15 weight percent. If the weight percent solids is too great, however, the monomers do not form a single phase with the organic solvent. Further, increasing the percent solids tends to result in the formation of precursor polymeric material with a lower BET specific surface area. The percent solids can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 70 weight percent, 5 to 60 weight percent, 5 to 50 weight percent, 5 to 40 weight percent, 5 to 30 weight percent, or 5 to 25 weight percent.

In addition to the monomer mixture and organic solvent, the polymerizable compositions used to form the precursor polymeric material typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on the total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al(III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a precursor polymeric material.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a precursor polymeric material can be prepared that has a BET specific surface area equal to at least 100 m$^2$/gram. The BET specific surface area of the precursor polymeric material can be at least 150 m$^2$/gram, at least 200 m$^2$/gram, or at least 300 m$^2$/gram. The BET specific surface area can be, for example, up to 1000 m$^2$/gram or higher, up to 900 m$^2$/gram, up to 800 m$^2$/gram, up to 750 m$^2$/gram, or up to 700 m$^2$/gram.

The precursor polymeric material is the reaction product of the polymerizable composition. The precursor polymeric material formed from the polymerizable composition contains (a) 8 to 65 weight percent of a first monomeric unit of Formula (I),

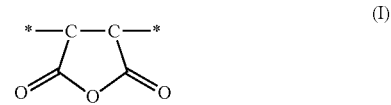

(I)

(b) 30 to 85 weight percent of a second monomeric unit of Formula (II), and

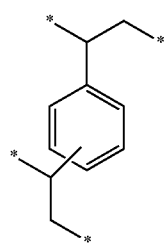

(II)

(c) 0 to 40 weight percent of a third monomeric unit of Formula (III) wherein $R_3$ is hydrogen or alkyl (e.g., an alkyl having 1 to 10 carbon atoms, 1 to 6 carbon atoms, or 1 to 4 carbon atoms).

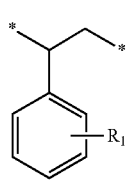

(III)

In many embodiments, to be particularly effective as a polymeric sorbent for reactive gases, the precursor polymeric material contains (a) 15 to 65 weight percent of a first monomeric unit of Formula (I), (b) 30 to 85 weight percent of a second monomeric unit of Formula (II), and (c) 0 to 40 weight percent (or 5 to 40 weight percent) of a third monomeric unit of Formula (III). Each weight percent value is based on the total weight of monomeric units in the precursor polymeric material.

Some embodiments of the precursor polymeric material contain 25 to 65 weight percent of the first monomeric unit of Formula (I), 30 to 75 weight percent of the second monomeric unit of Formula (II), and 1 to 20 weight percent (or 5 to 20 weight percent) of the third monomeric unit of Formula (III). Some embodiments contain 25 to 60 weight percent of the first monomeric unit of Formula (I), 30 to 75 weight percent of the second monomeric unit of Formula (II), and 1 to 30 weight percent (or 5 to 30 weight percent or 10 to 30 weight percent) of the third monomeric unit of Formula (III). In still other embodiments, the monomer mixture contains 30 to 65 weight percent of the first monomeric unit of Formula (I), 30 to 70 weight percent of the second monomeric unit of Formula (II), and 1 to 20 weight percent (or 5 to 20 weight percent or 10 to 20 weight percent) of the third monomeric unit of Formula (III). In still other embodiments, the monomer mixture contains 30 to 60 weight percent of the first monomeric unit of Formula (I), 30 to 65 weight percent of the second monomeric unit of Formula (II), and 1 to 20 weight percent (or 5 to 20 weight percent or 10 to 20 weight percent) of the third monomeric unit of Formula (III). In further embodiments, the monomer mixture contains 40 to 60 weight percent of the first monomeric unit of Formula (I), 30 to 55 weight percent of the second monomeric unit of Formula (II), and 1 to 20 weight percent (or 5 to 20 weight percent, or 10 to 20 weight percent) of the third monomeric unit of Formula (III). In still further embodiments, the monomer mixture contains 20 to 40 weight percent of the first monomeric unit of Formula (I), 50 to 70 weight percent of the second monomeric unit of Formula (II), and 1 to 20 weight percent (or 5 to 20 weight percent or 10 to 20 weight percent) of the third monomeric unit of Formula (III). The weight percent values are based on the total weight of monomeric units used in the precursor polymeric material.

The polymeric sorbent is formed by reacting the precursor polymeric material with a nitrogen-containing compound. The nitrogen-containing compound, which is usually basic, reacts with the anhydride group in the precursor polymeric material. That is, the nitrogen-containing compound reacts with the monomeric units of Formula (II) within the precursor polymeric material. This reaction results in the formation of a covalent bond linking the nitrogen-containing compound to the polymeric material. That is, the polymeric sorbent has covalently attached nitrogen-containing groups.

The nitrogen-containing compound is ammonia or a compound having at least one primary or secondary amino group. The at least one primary or secondary amino group is of formula —NHR. Suitable alkyl R groups (i.e., an alkyl is a monovalent radical of an alkane) often have 1 to 20 carbon atoms. For example, the alkyl can have at least 1 carbon atom, at least 2 carbon atoms, or at least 4 carbon atoms and can have up to 20 carbon atoms, up to 18 carbon atoms, up to 16 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The primary amino group and/or the secondary amino group reacts with the anhydride groups in the monomeric units of Formula (I) within the precursor polymeric material.

In some embodiments, the nitrogen-containing compound has a single primary amino group or a single secondary amino group. In other embodiments, the nitrogen-containing compound contains a plurality of amino groups. Such nitrogen-containing compounds often have a first amino group that is a primary amino group or a secondary amino group and at least one second amino group that is a primary amino group, a secondary amino group, or a tertiary amino group.

Many suitable nitrogen-containing compounds are of Formula (IV).

$$R_3NHR_2 \quad (IV)$$

In Formula (IV), the group $R_2$ is hydrogen or an alkyl. The group $R_3$ is hydrogen, alkyl, a group of formula —$R_4$—$NR_5R_6$, or —(C=NH)–$NH_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)–$NH_2$.

Formula (IV) is equal to ammonia when both $R_2$ and $R_3$ are hydrogen. Formula (IV) is equal to a compound having a single primary amino group when $R_2$ is hydrogen and $R_3$ is alkyl. Formula (IV) is equal to a compound having a single secondary amino group when both $R_2$ and $R_3$ are both alkyl. Formula (IV) is equal to a compound having at least two amino groups when $R_3$ is —$R_4$—$NR_5R_6$ or when $R_3$ is —(C=NH)–$NH_2$. Such compounds can have a first amino group that is a primary or secondary amino group plus at least one second amino group that is a primary amino group, secondary amino group, or tertiary amino group.

Suitable alkyl groups for $R_2$ in Formula (IV) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

In some embodiments, $R_3$ in Formula (IV) is an alkyl. In some example compounds, $R_2$ is equal to hydrogen. That is, the compound of Formula (IV) is a primary amine compound. Suitable alkyl groups for $R_3$ often have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. Specific examples of suitable primary amine compounds include, but are not limited to, methylamine, ethylamine, propylamine, butylamine, and cyclohexylamine. In other example compounds, $R_2$ is equal to alkyl. This is, the compound of Formula (IV) is a secondary amine compound. Specific examples of suitable secondary amine compounds include, but are not limited to, dimethylamine, diethylamine, dipropylamine, diisopropylamine, dibutylamine and dicyclohexylamine.

In other embodiments, $R_3$ in Formula (IV) is a group of formula —$R_4$—$NR_5R_6$ and the nitrogen-containing compound is of Formula (IV-1).

$R_6R_5N$–$R_4$—$NHR_2$ (IV-1)

Such compounds have at least two amino groups. Groups $R_2$, $R_4$, $R_5$, and $R_6$ are the same as defined above. Suitable alkyl $R_5$ and $R_6$ groups can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The group $R_4$ can be a covalent bond (i.e., the nitrogen containing compound is a hydrazine compound), an alkylene, an arylene, an aralkylene, a heteroalkylene having one or more oxy (—O—) groups, or a heteroalkylene having one or more —NH— groups.

Suitable alkylene (i.e., an alkylene is a divalent radical of an alkane) $R_4$ groups in Formula (IV-1) usually have at least 1 carbon atom, at least 2 carbon atoms, at least 3 carbon atoms, or at least 4 carbon atoms and can have up to 20 carbon atoms, up to 16 carbon atoms, up to 12 carbon atoms, up to 10 carbon atoms, or up to 6 carbon atoms. Some nitrogen-containing compounds are of Formula (IV-1) with $R_2$ being hydrogen, $R_4$ being an alkylene, $R_5$ being hydrogen, and $R_6$ being hydrogen. Examples of such nitrogen-containing compounds are alkylene diamines such as, for example, methylene diamine, ethylene diamine, propylene diamine, and butylene diamine. Nitrogen-containing compounds of Formula (IV-1) having both $R_2$ and $R_5$ equal to alkyl include N,N'-dimethylethylene diamine. A nitrogen-containing compounds of Formula (IV-1) where $R_2$ is hydrogen and both $R_5$ and $R_6$ are alkyl is N,N-dimethylethylene diamine.

In other embodiments of the compounds of Formula (IV-1), the group $R_4$ is a heteroalkylene (i.e., a heteroalkylene is a divalent radical of a heteroalkane, which is an alkane having catenary heteroatoms) having at least one catenary —O— or —NH— group. Stated differently, heteroalkylene $R_4$ groups have one or more groups of formula —$R_a$—$[O—R_b]_n$— or —$R_a$—$[NH—R_b]_n$— where each $R_a$ and each $R_b$ are independently an alkylene and n is an integer in a range of 1 to 50, 1 to 40, 1 to 30, 1 to 20, 1 to 10, 1 to 6, or 1 to 4. Suitable $R_a$ and $R_b$ alkylene groups often have 1 to 10 carbon atoms, 1 to 6 carbon atoms, 1 to 4 carbon atoms, or 1 to 3 carbon atoms. The heteroalkylene often has up to 30 carbon atoms and up to 16 heteroatoms, up to 20 carbon atoms and up to 11 heteroatoms, or up to 10 carbon atoms and up to 6 heteroatoms. Such nitrogen-containing compounds can be represented by Formulas (IV-2) and (IV-3).

$R_6R_5N$—$R_a$—$[O—R_b]_n$—$NHR_2$ (IV-2)

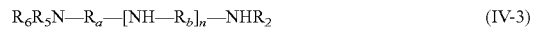
$R_6R_5N$—$R_a$—$[NH—R_b]_n$—$NHR_2$ (IV-3)

Some nitrogen-containing compounds are of Formula (IV-2) with $R_2$ being hydrogen, $R_4$ being a heteroalkylene with —O— groups, $R_5$ being hydrogen, and $R_6$ being hydrogen. Examples of such nitrogen-containing compounds are poly (alkylene oxide) diamines such as polyethylene glycol diamine and polypropylene glycol diamine. Further nitrogen-containing compounds are of Formula (IV-3) with $R_2$ being hydrogen, $R_4$ (in Formula (IV-1)) being a heteroalkylene with —NH— groups, $R_5$ being hydrogen, and $R_6$ being hydrogen. Such nitrogen-containing compounds can be, for example, compounds of formula $H_2N$—$[(CH_2)_xNH]_y$—$(CH_2)_xNH_2$ where x is an integer in a range of 1 to 4 and y is in a range of 1 to 10. Examples include diethylene triamine, triethylene tetramine, and tetraethylene pentamine.

The $R_4$ group in Formula (IV-1) can also be an arylene or aralkylene group. Suitable arylene (i.e., divalent radical of a carbocylic aromatic compound) $R_4$ groups typically have 6 to 12 carbon atoms and are often phenylene or diphenylene. Suitable aralkylene $R_4$ groups refer to divalent groups that have an alkylene substituted by an aryl group, an arylene substituted with an alkyl group, or an arylene bonded to an alkylene group. The alkylene or alkyl portion of the aralkylene often has 1 to 10 carbon atoms, 1 to 6 carbon atoms, or 1 to 4 carbon atoms. The aryl or arylene portion of the aralkylene often has 6 to 12 carbon atoms and is often either phenyl or phenylene. Example nitrogen-containing compounds of Formula (IV-1) with $R_2$, $R_5$, and $R_6$ being hydrogen and $R_4$ being arylene include, but are not limited to, phenylene diamine.

Yet other nitrogen-containing compounds are of Formula (IV-1) with $R_6$ being —(C=NH)—$NH_2$ and $R_5$ being hydrogen as shown in Formula (IV-4).

$H_2N$—(C=NH)—HN—$R_4$—$NHR_2$ (IV-4)

For example, in some compounds, $R_2$ is hydrogen and $R_4$ is alkylene. One such compound is agmatine. Agmatine can be represented by other resonance structures as well but is considered to be within the scope of both Formula (IV-1) and (IV-4).

In other embodiments of Formula (IV), $R_3$ is a group —(C=NH)—$NH_2$. The resulting compounds are of Formula (IV-5).

$H_2N$—(C=NH)—$NHR_2$ (IV-5)

This compound is guanidine when $R_2$ is hydrogen.

Other suitable nitrogen-containing compounds are polyamines having at least three groups of formula —$NHR_2$ where $R_2$ is hydrogen or alkyl. Such compounds can be of Formula (V).

$R_7$—$(NHR_2)_z$ (V)

In Formula (V), $R_2$ is defined as above and the variable z is equal to at least 3 and can be up to 10, up to 8, up to 6, or up to 4. The $R_7$ group is often a z-valent radical of an alkane or a z-valent radical of a heteroalkane. Suitable z-valent radicals of alkanes often have a branching carbon atom with at least three of the four adjacent groups being —$CH_2$—. Suitable z-valent radicals of heteroalkanes often have a branching nitrogen atom with three adjacent carbon atoms (e.g., three adjacent groups that are alkylene or alkyl groups) or a branching carbon atom with at least three of the four adjacent atoms being carbon (e.g., three adjacent groups that are alkylene or alkyl groups). These z-valent radicals of heteroalkanes often include one or more groups of formula —$R_c$—[NH—$R_d$]$_p$— where each $R_c$ and each $R_d$ are independently an alkylene and p is an integer in a range of 1 to 50, 1 to 40, 1 to 30, 1 to 20, 1 to 10, 1 to 6, or 1 to 4. Suitable $R_c$ and $R_d$ alkylene groups often have 1 to 10 carbon atoms, 1 to 6 carbon atoms, 1 to 4 carbon atoms, or 1 to 3 carbon atoms. The z-valent radicals of alkanes often have at least 2 carbon atoms, at least 3 carbon atoms, at least 4 carbon atoms, or at least 5 carbon atoms and up to 20 carbon atoms, up to 16 carbon atoms, up to 12 carbon atoms, or up to 8 carbon atoms. The z-valent radicals of heteroalkanes often have up to 30 carbon atoms and up to 16 heteroatoms, up to 20 carbon atoms and up to 11 heteroatoms, or up to 10 carbon atoms and up to 6 heteroatoms.

Specific polyamines of formula $R_7$—(NHR$_2$)$_z$ include various polyimines. Some polyimines include one or more branching nitrogen atoms with each nitrogen-branching atom connected to three groups of formula —$R_c$—[NH—$R_d$]$_p$—. The end group of each branched segment is often a group of formula —NHR$_2$ such as —NH$_2$. Examples include various branched polyethyleneimines. Another specific polyamine is 2-(aminomethyl)-2-methyl-1,3-propanediamine where $R_7$ is a trivalent radical of an alkane (i.e., the carbon branching atom is connected to four carbon atoms with three adjacent alkylene groups and one adjacent methyl group), each $R_2$ is hydrogen, and z is equal to 3.

In many embodiments, the nitrogen-containing compounds such as those of Formula (IV) (including Formula (IV-1) to (IV-5)) and Formula (V) have a molecular weight (or weight average molecular weight) that is no greater than 2000 Daltons (Da). For example, the molecular weight (or weight average molecular weight) is no greater than 1500 Da, no greater than 1000 Da, no greater than 750 Da, no greater than 500 Da, or no greater than 250 Da.

The nitrogen-containing compound reacts with the monomeric units of Formula (I) in the precursor polymeric material. This reaction results in the covalent bonding of the nitrogen-containing compound to the polymeric material with the reaction sites being the anhydride group (—(CO)—O—(CO)—) in the monomeric unit of Formula (I). The ring structure is typically opened forming monomeric units of Formula (VI), Formula (VII), or a mixture thereof.

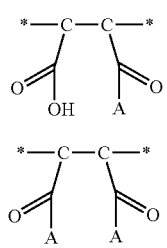

(VI)

(VII)

In Formula (VI) and (VII), group A is equal to —NR$_2$R$_3$ if a nitrogen-containing compound of Formula (IV) is used and is equal to —NR$_2$—R$_7$(NHR$_2$)$_{z-1}$ if a nitrogen-containing compound of Formula (V) is used. Alternatively, a ring structure could possibly form such as shown in Formula (VIII) where $A_1$ is a divalent group and is equal to the compound of Formula (IV) or to the compound of Formula (V) minus two hydrogen atoms.

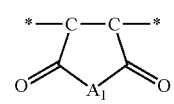

(VIII)

The polymeric sorbent has one or more covalently attached nitrogen-containing groups that have primary amino groups, secondary amino groups, tertiary amino groups, or a mixture of these different types of amino groups.

In some embodiments, the nitrogen containing compound used to form the polymeric sorbent is of Formula (IV).

(IV)

The polymeric sorbent can have nitrogen-containing groups of formula —NR$_2$R$_3$ where $R_2$ is hydrogen or alkyl and $R_3$ is hydrogen, alkyl, a group of formula —R$_4$—NR$_5$R$_6$, or —(C=NH)—NH$_2$.

If the nitrogen-containing compound is of Formula (IV-1),

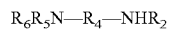

(IV-1)

the nitrogen-containing group is often of formula —NR$_2$—R$_4$—NR$_6$R$_5$. Alternatively, if either $R_5$ or $R_6$ is hydrogen, the nitrogen-containing group can be of formula —R$_5$N—R$_4$—NHR$_2$ or —R$_6$N—R$_4$—NHR$_2$. More than one type of nitrogen-containing group may be present on the polymeric sorbent.

If the nitrogen-containing compound is of Formula (IV-4),

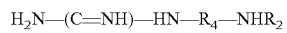

(IV-4)

the nitrogen-containing groups can be of formula —NR$_2$—R$_4$—NH—(C=NH)—NH$_2$, of formula —NH—(C=NH)—HN—R$_4$—NHR$_2$, or both.

If the nitrogen-containing compound is of Formula (IV-5),

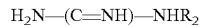

(IV-5)

the nitrogen containing groups can be of formula —NR$_2$—(C=NH)—NH$_2$, of formula —NH—(C=NH)—NHR$_2$, or both.

If the nitrogen-containing compound is of Formula (V),

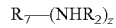

(V)

the nitrogen-containing groups can be of formula —NR$_2$—R$_7$—(NHR$_2$)$_{z-1}$.

Up to two moles of nitrogen-containing compound can be added for every mole of monomeric units of Formula (I) in the precursor polymeric material. That is, up to 200 mole percent nitrogen-containing compound can react with the precursor polymeric material based on the total moles of monomeric units of Formula (I). In some embodiments, the amount of nitrogen-containing compound added is up to 175 mole percent, up to 150 mole percent, up to 125 mole percent, or up to 100 mole percent based on the total moles of monomeric units of Formula (I) in the precursor polymeric material. The amount of the nitrogen-containing compound can be at least 1 mole percent, at least 2 mole percent, at least 5 mole percent, at least 10 mole percent, at least 20 mole percent, at least 50 mole percent, at least 75 mole percent, or at least 100 mole percent based on the total moles of monomeric units of Formula (I) in the precursor polymeric material. In some embodiments, the amount of nitrogen-containing compound is in a range of 1 to 200 mole percent, in a range of 10 to 200 mole percent, in a range of 50 to 200 mole percent, in a range of 50 to 150 mole percent, a range of 75 to 150 mole percent, in a range of 75 to 125 mole percent, or in a range of 100 to 200 mole percent based on the total moles of monomeric units of Formula (I) in the precursor polymeric material.

To react the nitrogen-containing compound with the precursor polymeric material, the nitrogen-containing compound is often dissolved in water and/or a suitable organic solvent. Suitable organic solvents are those that dissolve but do not react with the nitrogen-containing compound. Exemplary organic solvents include, but are not limited to, alcohols, ethers such as tetrahydrofuran and diethyl ether, and various chlorinated solvents such as methylene chloride and chloroform. The concentration of the nitrogen-containing compound in water and/or organic solvent can be any suitable amount depending on the solubility of the nitrogen-containing compound. In some embodiments, the concentration of the nitrogen-containing compound in water and/or organic solvent is in a range of 1 to 40 weight percent, in a range of 1 to 30 weight percent, in a range of 1 to 20 weight percent, or in a range of 1 to 10 weight percent.

The solution of the nitrogen-containing compound is mixed with the precursor polymeric material. The reaction between the nitrogen-containing compounds and the monomeric units of Formula (I) can occur at room temperature or can occur by heating the mixture to a temperature above room temperature. For example, the mixture can be heated at temperatures in a range of 30 to 120° C. for several hours to several days. In some embodiments, the suspension is heated at 30 to 100° C., 40 to 90° C., 50 to 90° C., or 60 to 80° C. for 12 to 24 hours.

The polymeric sorbent typically has a BET specific surface area that is less than that of the precursor polymeric material. The opening of the anhydride group to form the monomeric units of Formula (VI) and (VII) may sufficiently increase the conformational freedom in the backbone resulting in decreased porosity. In addition, hydrogen bonding between the nitrogen-containing groups in the monomeric units of Formula (VI), (VII), and (VIII) could possibly restrict or block access to pores. Because of this decrease, it is often desirable to prepare a precursor polymeric material having the highest possible BET specific surface area yet having sufficient anhydride groups to react with the nitrogen-containing compound.

The polymeric sorbent typically has a BET specific surface area equal to at least 25 $m^2$/gram. In some embodiments, the BET specific surface area is at least 50 $m^2$/gram, at least 75 $m^2$/gram, or at least 100 $m^2$/gram. The BET specific surface area can be up to 700 $m^2$/gram or higher, up to 600 $m^2$/gram, up to 500 $m^2$/gram, up to 400 $m^2$/gram, up to 300 $m^2$/gram, or up to 200 $m^2$/gram. In some embodiments, the BET specific surface area is in a range of 25 to 600 $m^2$/gram, in a range of 25 to 500 $m^2$/gram, in a range of 25 to 400 $m^2$/gram, in a range of 25 to 300 $m^2$/gram, in a range of 50 to 300 $m^2$/gram, in a range of 50 to 200 $m^2$/gram, in a range of 75 to 200 $m^2$/gram, or in a range of 50 to 100 $m^2$/gram.

Figure 2:
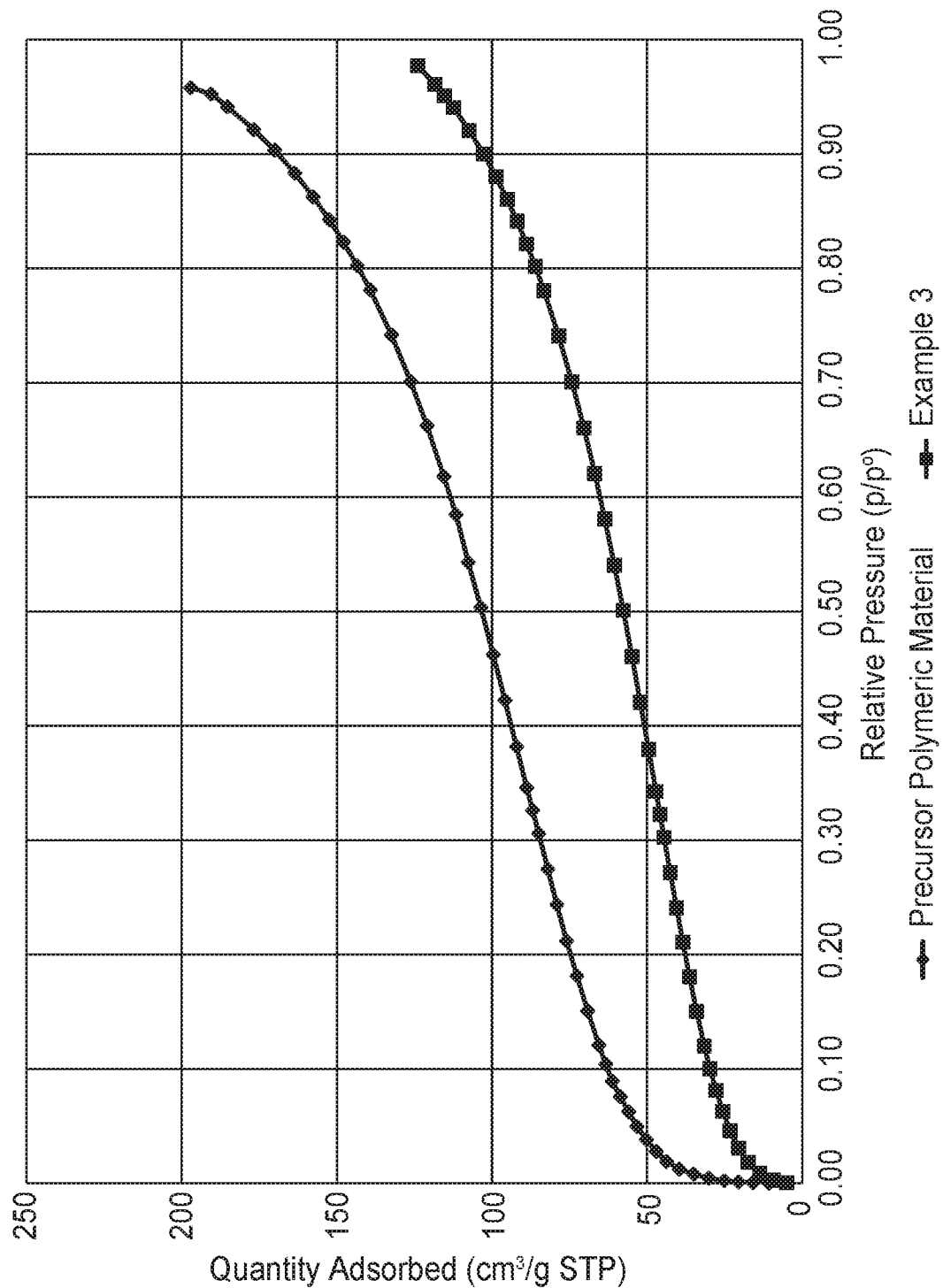
FIG. 2 is the argon adsorption isotherms at 77° K and at relative pressures up to 0.98±0.01 for the polymeric sorbent of Example 3 and the precursor polymeric material from which it was prepared.

The BET specific surface area is at least partially attributable to the presence of micropores and/or mesopores in the polymeric sorbent. The argon adsorption isotherms (at 77° K) of the polymeric sorbent indicate that there is considerable adsorption of argon at relative pressures below 0.1, which suggests that micropores are present. There is a gradual increase in adsorption at relative pressures between 0.1 and about 0.95. This increase is indicative of a wide size distribution of mesopores. Argon adsorption isotherms are shown in FIG. 1 and FIG. 2 for the polymeric sorbents of Examples 2 and 3 and the precursor polymeric materials from which they were prepared.

In some embodiments, at least 20 percent of the BET specific surface area of the polymeric sorbent is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The porous polymeric sorbent has a total pore volume equal to at least 0.05 $cm^3$/gram. Total pore volume is calculated from the amount of argon adsorbed at liquid nitrogen temperature (77° K) at a relative pressure ($p/p°$) equal to approximately 0.98 (e.g., 0.98±0.01). In some embodiments, the total pore volume is at least 0.075 $cm^3$/gram, at least 0.10 $cm^3$/gram, at least 0.15 $cm^3$/gram, at least 0.20 $cm^3$/gram, at least 0.25 $cm^3$/gram, or at least 0.30 $cm^3$/gram. The total pore volume can be up to 1.0 $cm^3$/gram or even higher, up to 0.9 $cm^3$/gram, up to 0.8 $cm^3$/gram, up to 0.7 $cm^3$/gram, up to 0.6 $cm^3$/gram, up to 0.5 $cm^3$/gram, up to 0.4 $cm^3$/gram, up to 0.3 $cm^3$/gram, or up to 0.2 $cm^3$/gram. The pore volume is often in a range of 0.05 to 1 $cm^3$/gram, in a range of 0.05 to 0.8 $cm^3$/gram, in a range of 0.05 to 0.6 $cm^3$/gram, in a range of 0.05 to 0.4 $cm^3$/gram, in a range of 0.05 to 0.2 $cm^3$/gram, or in a range of 0.75 to 0.2 $cm^3$/gram.

The structure of the divinylbenzene/maleic anhydride polymeric material is particularly well suited for use as a precursor polymeric material for the porous polymeric sorbent. Providing that the content of monomeric units of Formula (III) from styrene-type monomers are low, the divinylbenzene/maleic anhydride precursor polymeric material has alternating monomeric units from divinylbenzene and maleic anhydride. This structure results in high cross-linking and contributes to the formation of a porous polymeric material, particularly a porous polymeric material having a high content of micropores and/or mesopores.

In some embodiments, the polymeric sorbent further includes an acid-base indicator. The acid-base colorimetric indicator (i.e., a dye (typically an organic dye) that changes color when it undergoes a transition from being in an acidic form to being in a basic form) can be added at the same time as the nitrogen-containing compound or can be added after addition of the nitrogen-containing compound. The acid-base colorimetric indicator is typically selected to have a $pK_b$ that is less than a $pK_b$ of the nitrogen-containing compound. That is, the acid-base colorimetric indicator is selected to change from a first color to a second color when all or a significant portion of the available nitrogen-containing groups on the polymeric sorbent have reacted with a reactive gas. The change in color signals that the capacity of the polymeric sorbent for sorption of a reactive gas has been reached or is close to being reached. As used herein, the term "close to being reached" means that at least 60 percent or more of the capacity has been reached (i.e., a least 60 percent or more of the available sorption sites have been used for sorption of a reactive gas). For example, at least 70 percent, at least 80 percent, at least 90 percent, or at least 95 percent of the sorption sites have been used for sorption of a reactive gas.

Knowing the $pK_b$ of the nitrogen-containing compound, one of skill in the art can readily select an acid-base colorimetric indicator that has a lower $pK_b$ value. In some applications, the difference between the $pK_b$ value of the nitrogen-containing compound and the $pK_b$ of the acid-base colorimetric indicator is at least 1, at least 2, at least 3, or at least 4. The $pK_b$ of the acid-base colorimetric indicator is often in a range of 3 to 10.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein.

The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 5 to 10 milligrams per milliliter. Often, about 0.5 grams of the polymeric sorbent is soaked in about 10 milliliters of the solution.

The polymeric sorbents offer a distinct advantage over sorbents based on impregnation of a capture agent. The capture agents are typically simply sorbed on the matrix material such as, for example, activated carbon. That is, the capture agents are usually not covalently attached to the matrix material and can migrate. In contrast, the polymeric sorbents described herein have covalently attached nitrogen-containing groups that interact with the reactive gas and that do not migrate.

In another aspect, a method of sorbing a reactive gas on a polymeric sorbent is provided. The method includes providing a polymeric sorbent and then sorbing the reactive gas on the polymeric sorbent. The reactive gas is an acid gas, an acid gas precursor, or both. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia or a compound having at least one primary amino group or secondary amino group. Suitable nitrogen-containing compounds are typically of Formula (IV) and (V) as described above.

The reactive gas is an acid gas, an acid gas precursor, or both. The reactive gas typically contains a halogen atom, a sulfur atom, or a nitrogen atom. Examples of acid gases include hydrogen fluoride, hydrogen bromide, hydrogen chloride, sulfuric acid, sulfurous acid, hydrogen sulfide, nitric acid, and nitrous acid. Example acid gas precursors are fluorine, bromine, chlorine, sulfur dioxide, and nitrogen dioxide.

The reactive gases can be sorbed at room temperature or at any desired temperature such as in a range of −30° C. to 150° C., −30° C. to 100° C., or in a range of −20° C. to 50° C.

In another aspect, a composition is provided that includes the porous polymeric sorbent and a reactive gas sorbed on the porous polymeric sorbent. The polymeric sorbent and the reactive gas are the same as described above. The reactive gas can react with any primary amino group, secondary amino group, or tertiary amino group present on the polymeric sorbent. The reaction is an acid-base reaction.

The amount of reactive gas sorbed by the polymeric sorbent at room temperature (e.g., 25° C.) and standard pressure is often at least 0.1 mmoles/gram (i.e., at least 0.1 mmoles of reactive gas per gram of polymeric sorbent). For example, the amount of reactive gas sorbed can be at least 0.2 mmole/gram, at least 0.3 mmoles/gram, at least 0.4 mmoles/gram, or at least 0.5 mmoles/gram. The amount sorbed can be up to 10 mmoles/gram or even higher, up to 8 mmoles/gram, up to 6 mmoles/gram, up to 4 mmoles/gram, up to 2 mmoles/gram, or up to 1.5 mmoles/gram. The amount sorbed is often in a range of 0.1 to 10 mmoles/gram, in a range of 0.1 to 8 mmoles/gram, in a range of 0.2 to 10 mmoles/gram, in a range of 0.5 to 10 mmoles/gram, in a range of 1 to 10 mmoles/gram.

Various embodiments are provided that are a polymeric sorbent, a method of making a polymeric sorbent, a method of sorbing reactive gas on a polymeric sorbent, or a composition comprising a polymeric sorbent and reactive gas sorbed on the polymeric sorbent. The reactive gas is an acid gas, an acid gas precursor, or both.

Embodiment 1A is a polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia or a compound having at least one primary amino group or at least one secondary amino group.

Embodiment 2A is the polymeric sorbent of embodiment 1A, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 3A is the polymeric sorbent of embodiment 1A or 2A, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 4A is the polymeric sorbent of any one of embodiments 1A to 3A, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 5A is the polymeric sorbent of any one of embodiments 1A to 4A, wherein the nitrogen-containing compound has a molecular weight no greater than 2000 Daltons.

Embodiment 6A is the polymeric sorbent of any one of embodiments 1A to 5A, wherein the nitrogen-containing compound is of Formula (IV).

$$R_3NHR_2 \qquad\qquad (IV)$$

In Formula (IV), the group $R_2$ is hydrogen or an alkyl. The group $R_3$ is hydrogen, alkyl, a group of formula —$R_4$—$NR_5R_6$, or —(C=NH)—$NH_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 7A is the polymeric sorbent of embodiment 6A, wherein $R_3$ is alkyl.

Embodiment 8A is the polymeric sorbent of embodiment 7A, wherein $R_3$ has 1 to 6 carbon atoms or 1 to 4 carbon atoms.

Embodiment 9A is the polymeric material of embodiment 6A, wherein the nitrogen-containing compound of Formula (IV) is of Formula (IV-1).

$$R_6R_5N-R_4-NHR_2 \qquad (IV\text{-}1)$$

In Formula (IV-1), the group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 10A is the polymeric material of embodiment 9A, wherein $R_2$, $R_5$, and $R_6$ are each hydrogen.

Embodiment 11A is the polymeric material of embodiment 9A or 10A, wherein $R_4$ is a covalent bond and the nitrogen-containing compound is a hydrazine.

Embodiment 12A is the polymeric material of embodiment 9A wherein $R_4$ is an alkylene and the nitrogen-containing compound is an alkylene diamine. Example alkylene diamines include, but are not limited to, methylene diamine, ethylene diamine, propylene diamine, butylene diamine, N,N'-dimethylethylene diamine, and N,N-dimethylethylene diamine.

Embodiment 13A is the polymeric material of embodiment 9A, wherein $R_4$ is a heteroalkylene and the nitrogen-containing compound is of Formula (IV-2) or Formula (IV-3).

$$R_6R_5N-R_a-[O-R_b]_n-NHR_2 \qquad (IV\text{-}2)$$

$$R_6R_5N-R_a-[NH-R_b]_n-NHR_2 \qquad (IV\text{-}3)$$

In these formulas, $R_a$ is an alkylene; $R_b$ is an alkylene; and n is an integer in a range of 1 to 50.

Embodiment 14A is the polymeric sorbent of embodiment 13A, wherein the nitrogen-containing compound is of Formula (IV-2) and is a polyethylene glycol diamine or a polypropylene glycol diamine.

Embodiment 15A is the polymeric sorbent of embodiment 13A, wherein the nitrogen-containing compound is of Formula (IV-3) and is diethylene triamine, triethylene tetramine, or tetraethylene pentamine.

Embodiment 16A is the polymeric sorbent of embodiment 9A, wherein the nitrogen-containing compound of Formula (IV-1) is of Formula (IV-4)

$$NH_2-(C=NH)-HN-R_4-NHR_2 \qquad (IV\text{-}4)$$

wherein $R_4$ is an alkylene.

Embodiment 17A is the polymeric sorbent of embodiment 16A, wherein the nitrogen-containing compound is agmatine.

Embodiment 18A is the polymeric sorbent of embodiment 6A, wherein the nitrogen-containing compound of Formula (IV) is of Formula (IV-5).

$$H_2N-(C=NH)-NHR_2 \qquad (IV\text{-}5)$$

Embodiment 19A is the polymeric sorbent of embodiment 18A, wherein the nitrogen-containing compound is guanidine.

Embodiment 20A is the polymeric sorbent of embodiment 9A, wherein $R_4$ is an arylene. An example nitrogen-containing compound is phenylene diamine.

Embodiment 21A is the polymeric sorbent of any one of embodiment 1A to 5A, wherein the nitrogen-containing compound is of Formula (V).

$$R_7-(NHR_2)_z \qquad (V)$$

In Formula (V), $R_7$ is a z-valent radical of an alkane or a z-valent radical of a heteroalkane; and z is an integer in a range of 3 to 10. Group $R_2$ is hydrogen or alkyl.

Embodiment 22A is the polymeric sorbent of any one of embodiments 1A to 21A, wherein the polymeric sorbent has a nitrogen-containing group of formula —$NR_2R_3$ where $R_2$ is hydrogen or an alkyl and wherein $R_3$ is hydrogen, alkyl, a group of formula —$R_4$—$NR_5R_6$, or —(C=NH)—$NH_2$.

Embodiment 23A is the polymeric sorbent of any one of embodiments 1A to 12A, wherein the polymeric sorbent has nitrogen-containing groups of formula —$NR_2$—$R_4$—$NR_6R_5$, —$R_5N$—$R_4$—$NHR_2$, —$R_6N$—$R_4$—$NHR_2$, or a mixture thereof. The group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 24A is the polymeric sorbent of any one of embodiments 1A to 12A, wherein the polymeric sorbent has nitrogen-containing groups of formula —$NR_2$—$R_4$—NH—(C=NH)—$NH_2$, of formula —NH—(C=NH)—HN—$R_4$—$NHR_2$, or both. The group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups.

Embodiment 25A is the polymeric sorbent of any one of embodiments 1A to 12A, wherein the polymeric sorbent has nitrogen-containing groups of formula —$NR_2$—(C=NH)—$NH_2$, of formula —NH—(C=NH)—$NHR_2$, or both. The group $R_2$ is hydrogen or an alkyl.

Embodiment 26A is the polymeric sorbent of any one of embodiments 1A to 5A, wherein the polymeric sorbent has nitrogen-containing groups of formula —$NR_2$—$R_7$—$(NHR_2)_{z-1}$. Group $R_2$ is hydrogen or alkyl; $R_7$ is a z-valent radical of an alkane or of a heteroalkane; and z is an integer in a range of 3 to 10.

Embodiment 27A is the polymeric sorbent of any one of embodiments 1A to 26A, wherein the polymeric sorbent further comprising an acid-base dye.

Embodiment 28A is the polymeric sorbent of embodiment 27A, wherein the acid-base dye has a lower $pK_b$ than the nitrogen-containing compound.

Embodiment 29A is the polymeric sorbent of embodiment 27A or 28A, wherein a difference between the $pK_b$ of the nitrogen-containing compound and the $pK_b$ of the acid-base dye is equal to at least 2.

Embodiment 30A is the polymeric sorbent of any one of embodiments 1A to 29A, wherein the polymeric sorbent has a BET specific surface area equal to at least 25 $m^2/gram$.

Embodiment 1B is a method of sorbing a reactive gas on a polymeric sorbent. The method includes providing a polymeric sorbent of any one of embodiments 1A to 30A and sorbing the reactive gas on the polymeric sorbent. The reactive gas is an acid gas, an acid gas precursor, or both.

Embodiment 2B is the method of embodiment 1B, wherein the reactive gas has a halogen atom, a sulfur atom, or a nitrogen atom.

Embodiment 3B is the method of embodiment 1B or 2B, wherein the reactive gas is hydrogen fluoride, hydrogen bromide, hydrogen chloride, sulfuric acid, sulfurous acid, hydrogen sulfide, nitric acid, nitrous acid, or mixtures thereof.

Embodiment 4B is the method of embodiment 1B or 2B, wherein the reactive gas is chlorine, bromine, sulfur dioxide, nitrogen dioxide, or a mixture thereof.

Embodiment 5B is the method of any one of embodiments 1B to 4B, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 6B is the method of any one of embodiments 1B to 5B, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 7B is the method of any one of embodiments 1B to 6B, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 8B is the method of any one of embodiments 1B to 7B, wherein the nitrogen-containing compound of has a molecular weight no greater than 2000 Daltons.

Embodiment 9B is the method of any one of embodiments 1B to 8B, wherein the nitrogen-containing compound is of Formula (IV).

$$R_3NHR_2 \quad (IV)$$

In Formula (IV), the group $R_2$ is hydrogen or an alkyl. The group $R_3$ is hydrogen, alkyl, a group of formula —$R_4$—$NR_5R_6$, or —(C=NH)—$NH_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 10B is the method of embodiment 9B, wherein $R_3$ is alkyl.

Embodiment 11B is the method of embodiment 9B, wherein $R_3$ has 1 to 6 carbon atoms or 1 to 4 carbon atoms.

Embodiment 12B is the method of embodiment 9B, wherein the nitrogen-containing compound of Formula (IV) is of Formula (IV-1).

$$R_6R_5N—R_4—NHR_2 \quad (IV-1)$$

In Formula (IV-1), the group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 13B is the method of embodiment 12B, wherein $R_2$, $R_5$, and $R_6$ are each hydrogen.

Embodiment 14B is the method of embodiment 12B or 13B, wherein $R_4$ is a covalent bond and the nitrogen-containing compound is a hydrazine.

Embodiment 15B is the method of embodiment 12B or 13B, wherein $R_4$ is an alkylene and the nitrogen-containing compound is an alkylene diamine. Example alkylene diamines include, but are not limited to, methylene diamine, ethylene diamine, propylene diamine, butylene diamine, N,N'-dimethylethylene diamine, and N,N-dimethylethylene diamine.

Embodiment 16B is the method of embodiment 12B, wherein $R_4$ is a heteroalkylene and the nitrogen-containing compound is of Formula (IV-2) or Formula (IV-3).

$$R_6R_5N—R_a—[O—R_b]_n—NHR_2 \quad (IV-2)$$

$$R_6R_5N—R_a—[NH—R_b]_n—NHR_2 \quad (IV-3)$$

In these formulas, $R_a$ is an alkylene; $R_b$ is an alkylene; and n is an integer in a range of 1 to 50.

Embodiment 17B is the method of embodiment 16B, wherein the nitrogen-containing compound is of Formula (IV-2) and is a polyethylene glycol diamine or a polypropylene glycol diamine.

Embodiment 18B is the method of embodiment 16B, wherein the nitrogen-containing compound is of Formula (IV-3) and is diethylene triamine, triethylene tetramine, or tetraethylene pentamine.

Embodiment 19B is the method of embodiment 12B, wherein the nitrogen-containing compound of Formula (IV-1) is of Formula (IV-4)

$$NH_2—(C=NH)—HN—R_4—NHR_2 \quad (IV-4)$$

wherein $R_4$ is an alkylene.

Embodiment 20B is the method of embodiment 19B, wherein the nitrogen-containing compound is agmatine.

Embodiment 21B is the method of embodiment 9B, wherein the nitrogen-containing compound of Formula (IV) is of Formula (IV-5).

$$H_2N—(C=NH)—NHR_2 \quad (IV-5)$$

Embodiment 22B is the method of embodiment 21B, wherein the nitrogen-containing compound is guanidine.

Embodiment 23B is the method of embodiment 12B, wherein $R_4$ is an arylene. An example nitrogen-containing compound is phenylene diamine.

Embodiment 24B is the method of any one of embodiment 1B to 8B, wherein the nitrogen-containing compound is of Formula (V).

$$R_7—(NHR_2)_z \quad (V)$$

In Formula (V), $R_7$ is a z-valent radical of an alkane or a z-valent radical of a heteroalkane; and z is an integer in a range of 3 to 10. Group $R_2$ is hydrogen or alkyl.

Embodiment 25B is the method of any one of embodiments 1B to 24B, wherein the polymeric sorbent has a nitrogen-containing group of formula —$NR_2R_3$ where $R_2$ is hydrogen or an alkyl and wherein $R_3$ is hydrogen, alkyl, a group of formula —$R_4$—$NR_5R_6$, or —(C=NH)—$NH_2$.

Embodiment 26B is the method of any one of embodiments 1B to 12B, wherein the polymeric sorbent has nitrogen-containing groups of formula —$NR_2$—$R_4$—$NR_6R_5$, —$R_5N$—$R_4$—$NHR_2$, —$R_6N$—$R_4$—$NHR_2$, or a mixture thereof. The group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 27B is the method of any one of embodiments 1B to 12B, wherein the polymeric sorbent has nitrogen-containing groups of formula —$NR_2$—$R_4$—NH—

(C=NH)—NH$_2$, of formula —NH—(C=NH)—HN—R$_4$—NHR$_2$, or both. The group R$_2$ is hydrogen or an alkyl. The group R$_4$ is a covalent bond, an alkylene, an arylene, an aralkylene, a heteroalkylene having one or more oxy (—O—) groups, or a heteroalkylene having one or more —NH— groups.

Embodiment 28B is the method of any one of embodiments 1B to 12B, wherein the polymeric sorbent has nitrogen-containing groups of formula —NR$_2$—(C=NH)—NH$_2$, of formula —NH—(C=NH)—NHR$_2$, or both. The group R$_2$ is hydrogen or an alkyl.

Embodiment 29B is the method of any one of embodiments 1B to 8B, wherein the polymeric sorbent has nitrogen-containing groups of formula —NR$_2$—R$_7$—(NHR$_2$)$_{z-1}$. Group R$_2$ is hydrogen or alkyl; R$_7$ is a z-valent radical of an alkane or of a heteroalkane; and z is an integer in a range of 3 to 10.

Embodiment 30B is the method of any one of embodiments 1B to 29B, wherein the polymeric sorbent further comprising an acid-base dye.

Embodiment 31B is the method of embodiment 30B, wherein the acid-base dye has a lower pK$_b$ than the nitrogen-containing compound.

Embodiment 32B is the method of embodiment 30B or 31B, wherein a difference between the pK$_b$ of the nitrogen-containing compound and the pK$_b$ of the acid-base dye is equal to at least 2.

Embodiment 33B is the method of any one of embodiments 30B to 32B, wherein the acid-base dye changes color when the sorption capacity of the polymeric sorbent for the reactive gas is reached or is close to being reached.

Embodiment 34B is the method of any one of embodiments 1B to 33B, wherein the polymeric sorbent has a BET specific surface area equal to at least 25 m$^2$/gram.

Embodiment 35B is the method of any one of embodiments 1B to 34B, wherein the polymeric sorbent sorbs an amount of the reactive gas in a range of 0.1 to 10 millimoles per gram based on a weight of the polymeric sorbent.

Embodiment 1C is a composition that includes (a) a polymeric sorbent of any one of embodiments 1A to 30A and (b) a reactive gas sorbed on the polymeric sorbent. The reactive gas is an acid gas, an acid gas precursor, or both.

Embodiment 2C is the composition of embodiment 1C, wherein the reactive gas has a halogen atom, a sulfur atom, or a nitrogen atom.

Embodiment 3C is the composition of embodiment 1C or 2C, wherein the reactive gas is hydrogen fluoride, hydrogen bromide, hydrogen chloride, sulfuric acid, sulfurous acid, hydrogen sulfide, nitric acid, nitrous acid, or mixtures thereof.

Embodiment 4C is the composition of embodiment 1C or 2C, wherein the reactive gas is chlorine, bromine, sulfur dioxide, nitrogen dioxide, or a mixture thereof.

Embodiment 5C is the composition of any one of embodiments 1C to 4C, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 6C is the composition of any one of embodiments 1C to 5C, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 7C is the composition of any one of embodiments 1C to 6C, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 8C is the composition of any one of embodiments 1C to 7C, wherein the nitrogen-containing compound of has a molecular weight no greater than 2000 Daltons.

Embodiment 9C is the composition of any one of embodiments 1C to 8C, wherein the nitrogen-containing compound is of Formula (IV).

$$R_3NHR_2 \qquad (IV)$$

In Formula (IV), the group R$_2$ is hydrogen or an alkyl. The group R$_3$ is hydrogen, alkyl, a group of formula —R$_4$—NR$_5$R$_6$, or —(C=NH)—NH$_2$. The group R$_4$ is a covalent bond, an alkylene, an arylene, an aralkylene, a heteroalkylene having one or more oxy (—O—) groups, or a heteroalkylene having one or more —NH— groups. The group R$_5$ is hydrogen or alkyl. The group R$_6$ is hydrogen, alkyl, or —(C=NH)—NH$_2$.

Embodiment 10C is the composition of embodiment 9C, wherein R$_3$ is alkyl.

Embodiment 11C is the composition of embodiment 9C, wherein R$_3$ has 1 to 6 carbon atoms or 1 to 4 carbon atoms.

Embodiment 12C is the composition of embodiment 9C, wherein the nitrogen-containing compound of Formula (IV) is of Formula (IV-1).

$$R_6R_5N—R_4—NHR_2 \qquad (IV\text{-}1)$$

In Formula (IV-1), the group R$_2$ is hydrogen or an alkyl. The group R$_4$ is a covalent bond, an alkylene, an arylene, an aralkylene, a heteroalkylene having one or more oxy (—O—) groups, or a heteroalkylene having one or more —NH— groups. The group R$_5$ is hydrogen or alkyl. The group R$_6$ is hydrogen, alkyl, or —(C=NH)—NH$_2$.

Embodiment 13C is the composition of embodiment 12C, wherein R$_2$, R$_5$, and R$_6$ are each hydrogen.

Embodiment 14C is the composition of embodiment 12C or 13C, wherein R$_4$ is a covalent bond and the nitrogen-containing compound is a hydrazine.

Embodiment 15C is the composition of embodiment 12C or 13C, wherein R$_4$ is an alkylene and the nitrogen-containing compound is an alkylene diamine. Example alkylene diamines include, but are not limited to, methylene diamine, ethylene diamine, propylene diamine, butylene diamine, N,N'-dimethylethylene diamine, and N,N-dimethylethylene diamine.

Embodiment 16C is the composition of embodiment 12C, wherein R$_4$ is a heteroalkylene and the nitrogen-containing compound is of Formula (IV-2) or Formula (IV-3).

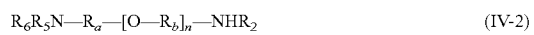

$$R_6R_5N—R_a—[O—R_b]_n—NHR_2 \qquad (IV\text{-}2)$$

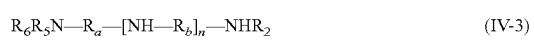

$$R_6R_5N—R_a—[NH—R_b]_n—NHR_2 \qquad (IV\text{-}3)$$

In these formulas, R$_a$ is an alkylene; R$_b$ is an alkylene; and n is an integer in a range of 1 to 50.

Embodiment 17C is the composition of embodiment 16C, wherein the nitrogen-containing compound is of Formula (IV-2) and is a polyethylene glycol diamine or a polypropylene glycol diamine.

Embodiment 18C is the composition of embodiment 16C, wherein the nitrogen-containing compound is of Formula (IV-3) and is diethylene triamine, triethylene tetramine, or tetraethylene pentamine.

Embodiment 19C is the composition of embodiment 12C, wherein the nitrogen-containing compound of Formula (IV-1) is of Formula (IV-4)

$$NH_2-(C=NH)-HN-R_4-NHR_2 \qquad (IV-4)$$

wherein $R_4$ is an alkylene.

Embodiment 20C is the composition of embodiment 19C, wherein the nitrogen-containing compound is agmatine.

Embodiment 21C is the composition of embodiment 9C, wherein the nitrogen-containing compound of Formula (IV) is of Formula (IV-5).

$$H_2N-(C=NH)-NHR_2 \qquad (IV-5)$$

Embodiment 22C is the composition of embodiment 21C, wherein the nitrogen-containing compound is guanidine.

Embodiment 23C is the method of embodiment 12C, wherein R is an arylene. An example nitrogen-containing compound is phenylene diamine.

Embodiment 24C is the composition of any one of embodiment 1C to 8C, wherein the nitrogen-containing compound is of Formula (V).

$$R_7-(NHR_2)_z \qquad (V)$$

In Formula (V), $R_7$ is a z-valent radical of an alkane or a z-valent radical of a heteroalkane; and z is an integer in a range of 3 to 10. Group $R_2$ is hydrogen or alkyl.

Embodiment 25C is the composition of any one of embodiments 1C to 24C, wherein the polymeric sorbent has a nitrogen-containing group of formula —$NR_2R_3$ where $R_2$ is hydrogen or an alkyl and wherein $R_3$ is hydrogen, alkyl, a group of formula —$R_4$—$NR_5R_6$, or —(C=NH)—$NH_2$.

Embodiment 26C is the composition of any one of embodiments 1C to 12C, wherein the polymeric sorbent has nitrogen-containing groups of formula —$NR_2$—$R_4$—$NR_6R_5$, —$R_6N$—$R_4$—$NHR_2$, —$R_6N$—$R_4$—$NHR_2$, or a mixture thereof. The group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—$NH_2$.

Embodiment 27C is the composition of any one of embodiments 1C to 12C, wherein the polymeric sorbent has nitrogen-containing groups of formula —$NR_2$—$R_4$—NH—(C=NH)—$NH_2$, of formula —NH—(C=NH)—HN—R—$NHR_2$, or both. The group $R_2$ is hydrogen or an alkyl. The group R is a covalent bond, an alkylene, an arylene, an aralkylene, a heteroalkylene having one or more oxy (—O—) groups, or a heteroalkylene having one or more —NH— groups.

Embodiment 28C is the composition of any one of embodiments 1C to 12C, wherein the polymeric sorbent has nitrogen-containing groups of formula —$NR_2$—(C=NH)—$NH_2$, of formula —NH—(C=NH)—$NHR_2$, or both. The group $R_2$ is hydrogen or an alkyl.

Embodiment 29C is the composition of any one of embodiments 1C to 8C, wherein the polymeric sorbent has nitrogen-containing groups of formula —$NR_2$—$R_7$—$(NHR_2)^{z-1}$. Group $R_2$ is hydrogen or alkyl; $R_7$ is a z-valent radical of an alkane or of a heteroalkane; and z is an integer in a range of 3 to 10.

Embodiment 30C is the composition of any one of embodiments 1C to 29C, wherein the polymeric sorbent further comprising an acid-base dye.

Embodiment 31C is the composition of embodiment 30C, wherein the acid-base dye has a lower $pK_b$ than the nitrogen-containing compound.

Embodiment 32C is the composition of embodiment 30C or 31C, wherein the difference between the $pK_b$ of the nitrogen-containing compound and the $pK_b$ of the acid-base dye is equal to at least 2.

Embodiment 33C is the composition of any one of embodiments 30C to 32C, wherein the acid-base dye changes color when the sorption capacity of the polymeric sorbent for the reactive gas is reached or is close to being reached.

Embodiment 34C is the composition of any one of embodiments 1C to 33C, wherein the polymeric sorbent has a BET specific surface area equal to at least 25 $m^2$/gram.

Embodiment 35C is the composition of any one of embodiments 1C to 34C, wherein the polymeric sorbent sorbs an amount of the reactive gas in a range of 0.1 to 10 millimoles per gram based on a weight of the polymeric sorbent.

Embodiment 1D is a method of preparing a polymeric sorbent. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia or a compound having at least one primary amino group or at least one secondary amino group.

Embodiment 2D is the method of embodiment 1D, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 3D is the method of embodiment 1D or 2D, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 4D is the method of any one of embodiments 1D to 3D, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 5D is the method of any one of embodiments 1D to 4D, wherein the nitrogen-containing compound has a molecular weight no greater than 2000 Daltons.

Embodiment 6D is the method of any one of embodiments 1D to 5D, wherein the nitrogen-containing compound is of Formula (IV).

$$R_3NHR_2 \qquad (IV)$$

In Formula (IV), the group $R_2$ is hydrogen or an alkyl. The group $R_3$ is hydrogen, alkyl, a group of formula —$R_4$—$NR_5R_6$, or —(C=NH)—$NH_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—NH$_2$.

Embodiment 7D is the method of embodiment 6D, wherein $R_3$ is alkyl.

Embodiment 8D is the polymeric sorbent of embodiment 7D, wherein $R_3$ has 1 to 6 carbon atoms or 1 to 4 carbon atoms.

Embodiment 9D is the method of embodiment 6D, wherein the nitrogen-containing compound of Formula (IV) is of Formula (IV-1).

$$R_6R_5N-R_4-NHR_2 \quad (IV-1)$$

In Formula (IV-1), the group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—NH$_2$.

Embodiment 10D is the method of embodiment 9D, wherein $R_2$, $R_5$, and $R_6$ are each hydrogen.

Embodiment 11D is the method of embodiment 9D or 10D, wherein $R_4$ is a covalent bond and the nitrogen-containing compound is a hydrazine.

Embodiment 12D is the method of embodiment 9D, wherein $R_4$ is an alkylene and the nitrogen-containing compound is an alkylene diamine. Example alkylene diamines include, but are not limited to, methylene diamine, ethylene diamine, propylene diamine, butylene diamine, N,N'-dimethylethylene diamine, and N,N-dimethylethylene diamine.

Embodiment 13D is the method of embodiment 9D, wherein $R_4$ is a heteroalkylene and the nitrogen-containing compound is of Formula (IV-2) or Formula (IV-3).

$$R_6R_5N-R_a-[O-R_b]_n-NHR_2 \quad (IV-2)$$

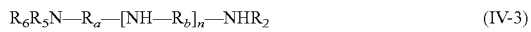

$$R_6R_5N-R_a-[NH-R_b]_n-NHR_2 \quad (IV-3)$$

In these formulas, $R_a$ is an alkylene; $R_b$ is an alkylene; and n is an integer in a range of 1 to 50.

Embodiment 14D is the method of embodiment 13D, wherein the nitrogen-containing compound is of Formula (IV-2) and is a polyethylene glycol diamine or a polypropylene glycol diamine.

Embodiment 15D is the method of embodiment 13D, wherein the nitrogen-containing compound is of Formula (IV-3) and is diethylene triamine, triethylene tetramine, or tetraethylene pentamine.

Embodiment 16D is the method of embodiment 9D, wherein the nitrogen-containing compound of Formula (IV-1) is of Formula (IV-4)

$$NH_2-(C=NH)-HN-R_4-NHR_2 \quad (IV-4)$$

wherein $R_4$ is an alkylene.

Embodiment 17D is the method of embodiment 16D, wherein the nitrogen-containing compound is agmatine.

Embodiment 18D is the method of embodiment 6D, wherein the nitrogen-containing compound of Formula (IV) is of Formula (IV-5).

$$H_2N-(C=NH)-NHR_2 \quad (IV-5)$$

Embodiment 19D is the method of embodiment 18D, wherein the nitrogen-containing compound is guanidine.

Embodiment 20D is the method of embodiment 9D, wherein $R_4$ is an arylene. An example nitrogen-containing compound is phenylene diamine.

Embodiment 21D is the method of any one of embodiments 1D to 5D, wherein the nitrogen-containing compound is of Formula (V).

$$R_7-(NHR_2)_z \quad (V)$$

In Formula (V), $R_7$ is a z-valent radical of an alkane or a z-valent radical of a heteroalkane; and z is an integer in a range of 3 to 10. Group $R_2$ is hydrogen or alkyl.

Embodiment 22D is the method of any one of embodiments 1D to 21D, wherein the polymeric sorbent has a nitrogen-containing group of formula —NR$_2$R$_3$ where $R_2$ is hydrogen or an alkyl and wherein $R_3$ is hydrogen, alkyl, a group of formula —R$_4$—NR$_5$R$_6$, or —(C=NH)—NH$_2$.

Embodiment 23D is the method of any one of embodiments 1D to 6D, wherein the polymeric sorbent has nitrogen-containing groups of formula —NR$_2$—R$_4$—NR$_6$R$_5$, —R$_5$N—R$_4$—NHR$_2$, —R$_6$N—R$_4$—NHR$_2$, or a mixture thereof. The group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen or alkyl. The group $R_6$ is hydrogen, alkyl, or —(C=NH)—NH$_2$.

Embodiment 24D is the method of any one of embodiments 1D to 6D, wherein the polymeric sorbent has nitrogen-containing groups of formula —NR$_2$—R$_4$—NH—(C=NH)—NH$_2$, of formula —NH—(C=NH)—HN—R$_4$—NHR$_2$, or both. The group $R_2$ is hydrogen or an alkyl. The group $R_4$ is a covalent bond, an alkylene, an arylene, an aralkylene, a heteroalkylene having one or more oxy (—O—) groups, or a heteroalkylene having one or more —NH— groups.

Embodiment 25D is the method of any one of embodiments 1D to 6D, wherein the polymeric sorbent has nitrogen-containing groups of formula —NR$_2$—(C=NH)—NH$_2$, of formula —NH—(C=NH)—NHR$_2$, or both. The group $R_2$ is hydrogen or an alkyl.

Embodiment 26D is the method of any one of embodiments 1D to 6D, wherein the polymeric sorbent has nitrogen-containing groups of formula —NR$_2$—R$_7$—(NHR$_2$)$_{z-1}$. Group $R_2$ is hydrogen or alkyl; $R_7$ is a z-valent radical of an alkane or of a heteroalkane; and z is an integer in a range of 3 to 10.

Embodiment 27D is the method of any one of embodiments 1D to 26D, wherein the polymeric sorbent further comprising an acid-base dye.

Embodiment 28D is the method of embodiment 27D, wherein the acid-base dye has a lower pK$_b$ than the nitrogen-containing compound.

Embodiment 29D is the method of embodiment 27D or 28D, wherein the difference between the pK$_b$ of the nitrogen-containing compound and the pK$_b$ of the acid-base dye is equal to at least 2.

Embodiment 30D is the method of any one of embodiments 1D to 29D, wherein the polymeric sorbent has a BET specific surface area equal to at least 25 m$^2$/gram.

EXAMPLES

TABLE 1

| List of materials. | |
|---|---|
| Chemical Name | Chemical Supplier |
| Divinylbenzene (DVB) (80% tech grade), which contained 80 weight percent DVB and 20 weight percent styrene-type monomers. The calculation of moles of DVB used to prepare the polymeric material takes into account the purity. | Sigma-Aldrich, Milwaukee, WI |

TABLE 1-continued

List of materials.

| Chemical Name | Chemical Supplier |
| --- | --- |
| Maleic anhydride (MA) | Alfa Aesar, Ward Hill, MA |
| Benzoyl peroxide (BPO) | Sigma-Aldrich, Milwaukee, WI |
| Ethyl acetate (EtOAc) | EMD Millipore Chemicals, Billerica, MA |
| Ethanol - denatured (EtOH) | EMD Millipore Chemicals, Billerica, MA |
| Ammonium hydroxide (28-30 wt. % ammonia) | EM Science, Gibbstown, NJ |
| Ethylenediamine (EDA) | Alfa Aesar, Ward Hill, MA |
| N,N'-dimethylethylenediamine (N,N'-DMEDA) | TCI America, Tokyo, Japan |
| Polyethyleneimine, branched (MW 600) | Polysciences, Warrington, PA |
| VAZO 52 | E. I. du Pont de Nemours, Wilmington, DE |
| N,N'-dimethylethylenediaminee (N,N-DMEDA) | Alfa Aesar, Ward Hill, MA |
| Methyl red | Alfa Aesar, Ward Hill, MA |
| Bromoxylenol blue | Sigma-Aldrich, Milwaukee, WI |
| Concentrated hydrogen chloride (HCl) | EMD Millipore Chemicals, Billerica, MA |

Gas Sorption Analysis:

Porosity and gas sorption experiments were performed using a Micromeritics Instrument Corporation (Norcross, Ga.) accelerated surface area and porosimetry (ASAP) 2020 system using adsorbates of ultra-high purity. The following is a typical method used for the characterization of the porosity within the exemplified materials. In a Micromeritics half inch diameter sample tube, 50-250 milligrams of material was degassed by heating under ultra-high vacuum (3-7 micrometers Hg) on the analysis port of the ASAP 2020 to remove residual solvent and other adsorbates. The degas procedure for the precursor polymeric materials was 2 hours at 150° C. The degas procedure for the polymeric sorbents was 2 hours at 80° C. Argon sorption isotherms at 77° K were obtained using low pressure dosing (5 cm$^3$/g) at a relative pressure (p/p°) less than 0.1 and a pressure table of linearly spaced pressure points for a p/p° from 0.1 to 0.98. The method for all isotherms made use of the following equilibrium intervals: 90 seconds at p/p° less than $10^{-5}$, 40 seconds at p/p° in a range of $10^{-5}$ to 0.1, and 20 seconds at p/p° greater than 0.1. Helium was used for the free space determination, after argon sorption analysis, both at ambient temperature and at 77° K. BET specific surface areas (SA$_{BET}$) were calculated from argon adsorption data by multipoint Brunauer-Emmett-Teller (BET) analysis. Apparent micropore distributions were calculated from argon adsorption data by density functional theory (DFT) analysis using the argon at 77° K on carbon slit pores by non-linear density functional theory (NLDFT) model. Total pore volume was calculated from the total amount of argon adsorbed at a p/p° equal to approximately 0.98. BET, DFT and total pore volume analyses were performed using Micromeritics MicroActive Version 1.01 software.

Sulfur Dioxide Capacity Test:

A simple flow-through custom built delivery system was used to deliver known concentrations of sulfur dioxide (SO$_2$) to the sample for measurement. An airstream was generated by delivering a compressed air stream (<5% RH) to a mass flow controller (0-10 L/minute) (Aalborg, Orangeburg, N.Y., USA). This airstream was calibrated using a digital flowmeter (0-10 L/minute) (TSI, Inc., Shoreview, Minn., USA). To this airstream, anhydrous SO$_2$ (Matheson TRIGAS, Inc., Basking Ridge, N.J., USA) was delivered by regulator to a mass flow controller (0-50 mL/minute) (Brooks Instrument, Hatfield, Pa., USA). This mass flow controller was calibrated by titration to correlate a setting on the mass flow controller to a flow rate of SO$_2$. This mixture of air and SO$_2$ gas was then passed into a tube containing an adsorbent material. The gas passed through the tube containing the sample to be tested and out the exit of the tube. At the exit of the tube, a probe led to an Interscan RM Series, 0-10.0 ppm electrochemical SO$_2$ detector (Interscan Company, Simi Valley, Calif., USA) which was able to detect the amount of SO$_2$ in the effluent exiting the tube containing the sample. The electrochemical detector was calibrated using a 5.0 ppm SO$_2$ gas cylinder (Oxygen Service Company, St. Paul, Minn., USA) in order to be able to correctly measure the concentration of the SO$_2$ exiting the tube. To generate a gas stream containing 1000 ppm of SO$_2$, 1.16 L/minute of air was delivered by the Aalborg mass-flow controller and combined with 1.16 mL/minute of SO$_2$ gas delivered by the Brooks mass-flow controller.

A sample to be tested for SO$_2$ removal capability was added to a tared test tube (2.2 cm inner diameter) until the bed depth in the tube was 1.0 cm after being tamped. The mass of the sample was then determined by weighing the sample in the test tube. The test tube was then connected in line with the system allowing the 1000 ppm SO$_2$ gas stream to flow through the sample and the concentration of SO$_2$ exiting the tube to be measured using the Interscan electrochemical SO$_2$ detector. At the time the SO$_2$ gas stream began to pass through the test sample, the test was considered started, and a timer was started. The end of the SO$_2$ gas test was defined as the point corresponding to the time at which the SO$_2$ effluent passing through the bed of the test material produced a signal on the electrochemical detector that exceeded the signal corresponding to 5 ppm. The performance of each test material was reported as the number of minutes until 5 ppm breakthrough was observed performing the test as described above. In addition, the area under the curve of the breakthrough plot until 5 ppm breakthrough coupled with the known mass of the test material used in this fixed volume test was used to calculate a mmoles/gram capacity for each test material using a sum of least squares equation.

Examples 1 and 2

In a 5 L round-bottom flask, 78.2 grams (481 mmoles) divinylbenzene (DVB) (80 wt. %, tech grade), 29.4 grams (300 mmoles) of maleic anhydride (MA), and 2.15 grams (8.88 mmoles) of benzoyl peroxide (BPO) were dissolved in 2153 grams of ethyl acetate (EtOAc). The polymerizable composition had 4.9 wt. % solids in EtOAc and contained a monomer mixture (58.1 wt. % DVB, 27.3 wt. % MA, and 14.5 wt. % styrene-type monomers) and 2 wt. % BPO (based on total weight of monomers). The polymerizable composition was bubbled with nitrogen for 30 minutes. The flask was then capped with a rubber septum and placed in a sand bath at 95° C. The polymerizable composition was heated at this elevated temperature for 18 hours. A white precipitate that had formed was isolated by vacuum filtration and washed with EtOAc. The solid was divided up and placed in three 32 ounce jars. The jars were then each filled with 750 mL of EtOAc. The solids were allowed to stand in EtOAc for one hour at room temperature. The solids were again isolated by vacuum filtration and washed with EtOAc. The solid was divided up again and placed in three 32 ounce jars. The jars were then each filled with 750 mL of EtOAc. The solids were allowed to stand in EtOAc overnight. The solids were again isolated by vacuum filtration and washed with EtOAc. The solid was then dried under high vacuum at 95° C. overnight. This precursor polymeric material had a $SA_{BET}$ of 624.5 m²/gram and a total pore volume of 0.606 cm³/gram (p/p° equal to 0.975) as determined by argon adsorption.

The amine functional polymeric sorbents of Examples 1 and 2 were prepared by reacting the precursor polymeric material described above with ammonium hydroxide/water (Example 1) or ethylene diamine (EDA)/ethanol (EtOH) (Example 2), respectively.

More specifically, the amine functional polymeric sorbent of Example 1 was prepared using the following procedure. In a 32 ounce jar, 5.0 mL (72.5 mmoles) of 14.5 M aqueous ammonium hydroxide was dissolved in 85 mL of deionized water. To this solution was added 3.00 grams of the precursor polymeric material. The jar was capped and placed in a sand bath at 90° C. This suspension was heated at this elevated temperature for 18 hours. The solid was isolated by vacuum filtration and washed with deionized water. The solid was placed in an 8 ounce jar, and 150 mL of deionized water was added to the jar. The solid was allowed to stand in the deionized water for four hours. The solid was again isolated by vacuum filtration and washed with deionized water. The solid was then dried under high vacuum at 80° C. for eight hours.

More specifically, the amine functional polymeric sorbent of Example 2 was prepared using the following procedure. In a 32 ounce jar, 29.8 mL (446 mmoles) of EDA was dissolved in 600 mL of EtOH. To this solution was added 10.0 grams of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 150 mL of EtOH was added to the jar. The solid was allowed to stand in the EtOH for four hours. The solid was again isolated by vacuum filtration and washed with EtOH. The solid was then dried under high vacuum at 80° C. for eight hours. The amine used to prepare each sample, $SA_{BET}$ and total pore volume of each amine functional polymeric sorbent are shown in Table 2.

TABLE 2

Porosity characterization of the amine functional polymeric sorbents of Examples 1 and 2.

| Example # | Amine Used To Prepare | $SA_{BET}$ (m²/g) | Total Pore Volume (cm³/g) (p/p°) |
|---|---|---|---|
| Example 1 | Ammonium hydroxide | 377.1 | 0.371 (0.977) |
| Example 2 | EDA | 466.5 | 0.485 (0.977) |

The amine functional polymeric sorbents of Examples 1 and 2 were each individually sieved to 40×80 mesh size, and this material was used to perform the sulfur dioxide ($SO_2$) vapor test, as described above, to determine the $SO_2$ capacity of each amine functional polymeric sorbent. The mass of sample used for the test, the number of minutes each test lasted and the calculated mmoles/gram capacity are shown in Table 3.

TABLE 3

Adsorption of $SO_2$ by Examples 1 and 2.

| Example # | Test Material Mass (grams) | Minutes Until 5 ppm Breakthrough | Capacity (mmoles/gram) |
|---|---|---|---|
| Example 1 | 1.029 | 2.9 | 0.13 |
| Example 2 | 0.676 | 8.5 | 0.58 |

Example 3

In a 4 ounce jar, 3.99 grams (24.5 mmoles) DVB (80 wt. %, tech grade), 6.01 grams (61.3 mmoles) of MA, and 204 milligrams (843 micromoles) of BPO were dissolved in 9.96 grams of EtOAc. The polymerizable composition had 50.1 wt. % solids in EtOAc and contained a monomer mixture (31.9 wt. % DVB, 60.1 wt. % MA, and 8.0 wt. % styrene-type monomers) and 2 wt. % BPO (based on total weight of monomers). The polymerizable composition was bubbled with nitrogen for 10 minutes. The jar was then capped and placed in a sand bath at 95° C. The polymerizable composition was heated at this elevated temperature for 18 hours. A white precipitate that had formed was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added. The solid was allowed to stand in EtOAc overnight. The solid was again isolated by vacuum filtration and washed with EtOAc. The solid was then dried under high vacuum at 95° C. for eight hours. This material had a $SA_{BET}$ of 240.4 m²/gram and a total pore volume of 0.275 cm³/gram (p/p° equal to 0.959) as determined by argon adsorption.

In a 32 ounce jar, 20.0 mL (299 mmoles) of EDA was dissolved in 400 mL of EtOH. To this solution was added 3.00 grams of the polymeric precursor material. The jar was capped and placed in a sand bath at 80° C. This suspension was heated at this elevated temperature for 18 hours. The solid was isolated by vacuum filtration and washed with EtOH. The solid was placed in a 4 ounce jar, and 50 mL of EtOH was added to the jar. The solid was allowed to stand in the EtOH for four hours. The solid was again isolated by vacuum filtration and washed with EtOH. The solid was then dried under high vacuum at 80° C. for eight hours. This material had a $SA_{BET}$ of 127.5 m²/gram and a total pore volume of 0.159 cm³/gram (p/p° equal to 0.977) as determined by argon adsorption.

The amine functional polymeric sorbent of Example 3 was sieved to 40×80 mesh size, and this material was used to perform the $SO_2$ vapor test, as described above, to determine the $SO_2$ capacity of this amine functional polymeric sorbent. The mass of sample used for the test, the number of minutes the test lasted and the calculated mmoles/gram capacity are shown in Table 4.

TABLE 4

Adsorption of $SO_2$ by Example 3.

| Example # | Test Material Mass (grams) | Minutes Until 5 ppm Breakthrough | Capacity (mmoles/gram) |
|---|---|---|---|
| Example 3 | 1.009 | 19.6 | 0.89 |

Examples 4-6

In a 2 L Parr stainless steel pressure vessel, 177.11 grams (1.09 moles) DVB (80 wt. %, tech grade), 240.05 grams (2.45 moles) of MA, and 4.17 grams (16.8 mmoles) of VAZO 52 were dissolved in 625.92 grams of EtOAc. The polymerizable composition had 40.0 wt. % solids in EtOAc and contained a monomer mixture (34.0 wt. % DVB, 57.5 wt. % MA, and 8.5 wt. % styrene-type monomers) and 1 wt. % VAZO 52 (based on total weight of monomers). The polymerizable composition was bubbled with nitrogen for 15 minutes. The pressure vessel was then sealed and placed in a heating mantle at 60° C. The polymerizable composition was heated at this elevated temperature for 18 hours. A white precipitate that had formed was isolated by vacuum filtration and washed with EtOAc. The solid was placed in a 4 L Erlenmeyer flask and 2.0 L of EtOAc was added to the flask. The solid was allowed to stand in EtOAc for one hour at room temperature. The solid was again isolated by vacuum filtration and washed with EtOAc. The solid was placed in a 4 L Erlenmeyer flask and 2.0 L of EtOAc was added. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 320.8 m²/gram and a total pore volume of 0.250 cm³/gram (p/p° equal to 0.977) as determined by argon adsorption.

The amine functional polymeric sorbents of Examples 4-6 were prepared by reacting the precursor polymeric material described above with 600 MW branched polyethyleneimine/EtOH (Example 4), N,N'-dimethylethylene diamine (N,N'-DMEDA)/EtOH (Example 5) or N,N-dimethylethylene diamine (N,N-DMEDA)/EtOH (Example 6), respectively.

More specifically, the amine functional polymeric sorbent of Example 4 was prepared using the following procedure. In a 32 ounce jar, 95.0 grams (158 mmoles) of a 600 MW branched polyethyleneimine was dissolved in 478 mL of EtOH. To this solution was added 20.0 grams of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 100 mL of EtOH was added to the jar. The solid was allowed to stand in the EtOH for four hours. The solid was again isolated by vacuum filtration and washed with EtOH. The solid was then dried under high vacuum at 120° C. for three hours.

More specifically, the amine functional polymeric sorbent of Example 5 was prepared using the following procedure. In an 4 ounce jar, 3.0 mL (27.9 mmoles) of N,N'-DMEDA was dissolved in 25 mL of EtOH. To this solution was added 2.00 grams of the precursor polymeric material. The jar was capped and placed in a sand bath at 85° C. This suspension was heated at this elevated temperature for 18 hours. The solid was isolated by vacuum filtration and washed with EtOH. The solid was placed in a 40 mL vial, and 35 mL of EtOH was added to the jar. The solid was allowed to stand in the EtOH for four hours. The solid was again isolated by vacuum filtration and washed with EtOH. The solid was then dried under high vacuum at 80° C. for eight hours.

More specifically, the amine functional polymeric sorbent of Example 6 was prepared using the following procedure. In an 4 ounce jar, 5.0 mL (45.8 mmoles) of N,N-DMEDA was dissolved in 26 mL of EtOH. To this solution was added 2.00 grams of the precursor polymeric material. The jar was capped and placed in a sand bath at 85° C. This suspension was heated at this elevated temperature for 18 hours. The solid was isolated by vacuum filtration and washed with EtOH. The solid was placed in a 40 mL vial, and 35 mL of EtOH was added to the jar. The solid was allowed to stand in the EtOH for four hours. The solid was again isolated by vacuum filtration and washed with EtOH. The solid was then dried under high vacuum at 80° C. for eight hours. The amine used to prepare each sample, $SA_{BET}$ and total pore volume of each amine functional polymeric sorbent are shown in Table 5.

TABLE 5

Porosity characterization of the amine functional polymeric sorbents of Examples 4-6.

| Example # | Amine Used To Prepare | $SA_{BET}$ (m²/g) | Total Pore Volume (cm³/g) (p/p°) |
|---|---|---|---|
| Example 4 | Polyethyleneimine | 110.4 | 0.167 (0.980) |
| Example 5 | N,N'-DMEDA | 131.4 | 0.150 (0.979) |
| Example 6 | N,N-DMEDA | 112.0 | 0.134 (0.979) |

The amine functional polymeric sorbents of Examples 4-6 were each individually sieved to 40×80 mesh size, and this material was used to perform the sulfur dioxide ($SO_2$) vapor test, as described above, to determine the $SO_2$ capacity of each amine functional polymeric sorbent. The mass of sample used for the test, the number of minutes each test lasted and the calculated mmoles/gram capacity are shown in Table 6.

TABLE 6

Adsorption of $SO_2$ by Examples 4-6.

| Example # | Test Material Mass (grams) | Minutes Until 5 ppm Breakthrough | Capacity (mmoles/gram) |
|---|---|---|---|
| Example 4 | 0.721 | 9.2 | 0.58 |
| Example 5 | 1.163 | 21.8 | 0.86 |
| Example 6 | 1.155 | 24.8 | 0.99 |

Examples 7 and 8

In a 1 L Parr stainless steel pressure vessel, 88.67 grams (0.545 moles) DVB (80 wt. %, tech grade), 120.02 grams (1.22 moles) of MA, and 2.09 grams (8.64 mmoles) of BPO were dissolved in 208.50 grams of EtOAc. The polymerizable composition had 50.0 wt. % solids in EtOAc and contained a monomer mixture (34.0 wt. % DVB, 57.5 wt. % MA, and 8.5 wt. % styrene-type monomers) and 1 wt. % BPO (based on total weight of monomers). The polymerizable composition was bubbled with nitrogen for 15 minutes. The pressure vessel was then sealed and placed in a heating mantle at 90° C. The polymerizable composition was heated at this elevated temperature for 18 hours. A white precipitate that had formed was isolated by vacuum filtration and washed with EtOAc. The solid was placed in a 2 L Erlenmeyer flask and 1.0 L of EtOAc was added to the flask. The solid was allowed to stand in EtOAc for one hour at room temperature. The solid was again isolated by vacuum filtration and washed with EtOAc. The solid was placed in a 2 L Erlenmeyer flask and 1.0 L of EtOAc was added. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 201.1 m²/gram and a total pore volume of 0.170 cm³/gram (p/p° equal to 0.980) as determined by argon adsorption.

In a 32 ounce jar, 131 mL (1.96 moles) of EDA was dissolved in 262 mL of EtOH. To this solution was added 20.0 grams of the precursor polymeric material. The jar was capped and placed in a sand bath at 80° C. This suspension was heated at this elevated temperature for 18 hours. The solid was isolated by vacuum filtration and washed with EtOH. The solid was placed in an 8 ounce jar, and 100 mL of EtOH was added to the jar. The solid was allowed to stand in the EtOH for four hours. The solid was again isolated by vacuum filtration and washed with EtOH. The solid was then dried under high vacuum at 80° C. for eight hours. This amine functional polymeric sorbent was sieved to 40×80 mesh size.

The two dye impregnated amine functional polymeric sorbents of Examples 7 and 8 were prepared using ethanolic solutions of methyl red and bromoxylenol blue, respectively. The following procedure was used to prepare Examples 7 and 8. Separate saturated ethanolic solutions of methyl red and bromoxylenol blue were prepared by adding 50 milligrams of methyl red and bromoxylenol blue to 10 mL of EtOH in a 20 mL vial. The resulting suspensions were filtered through a 1 micron glass frit filter (Pall Corporation, Port Wash., N.Y., USA) using a syringe to remove undissolved dye. These saturated dye solutions were put in separate 20 mL vials. To each solution was added 0.500 grams of the 40×80 mesh size amine functional polymeric sorbent. Each vial was capped, and each solid was allowed to stand in the ethanolic dye solution for 18 hours. Each solid was isolated by vacuum filtration without using additional ethanol to transfer or wash the material. Each solid was then dried under high vacuum at 80° C. for four hours.

The dyed amine functional polymeric sorbents of Examples 7 and 8 were each exposed to concentrated hydrogen chloride (HCl) (36% by weight HCl) in a test chamber consisting of a 1.2 L crystallizing dish containing 200 mL concentrated HCl. 100 mg of each of the dyed amine functional polymeric sorbents of Examples 7 and 8 were placed in individual 10 mL crystallizing dishes and floated in the concentrated HCl. A glass plate was put over the large crystallizing dish. The color of each dyed amine functional polymeric sorbent was observed over time. After 15 minutes of exposure, each of the dyed amine functional polymeric sorbents had changed color. The dye used, the color before exposure and the color after exposure of each dyed amine functional polymeric sorbent are shown in Table 7. This test was repeated exactly as described above except that, instead of concentrated HCl, deionized water was placed in the 1.2 L crystallizing dish. After 30 minutes of exposure to just moisture, none of the dyed amine functional polymeric sorbents showed any visual change in color.

TABLE 7

Color changing properties of the dyed amine functional polymeric sorbents of Examples 7 and 8 upon exposure to concentrated HCl.

| Example # | Dye | Color Before Test | Color at Test Completion |
|---|---|---|---|
| Example 7 | Methyl red | yellow | red |
| Example 8 | Bromoxylenol blue | navy blue | olive green |

What is claimed is:
1. A polymeric sorbent comprising a reaction product of:
(a) a precursor polymeric material comprising a polymerized product of a polymerizable composition comprising
(1) 8 to 65 weight percent maleic anhydride based on the total weight of monomers in the polymerizable composition;
(2) 30 to 85 weight percent divinylbenzene based on the total weight of monomers in the polymerizable composition; and
(3) 0 to 20 weight percent of a styrene-type monomer based on the total weight of monomers in the polymerizable composition, wherein the styrene-type monomer is styrene, an alkyl-substituted styrene, or a combination thereof; and
(b) a nitrogen-containing compound that is selected from ammonia or a compound having at least one primary amino group or at least one secondary amino group, the nitrogen-containing compound being of Formula (IV) or Formula (V)

$$R_3NHR_2 \qquad (IV)$$

$$R_7-(NHR_2)_z \qquad (V)$$

wherein
$R_2$ is hydrogen or an alkyl;
$R_3$ is hydrogen, alkyl, a group of formula —$R_4$—$NR_5R_6$, or —(C=NH)—$NH_2$;
$R_4$ is a covalent bond, an alkylene, an arylene, an aralkylene, a heteroalkylene having one or more oxy (—O—) groups, or a heteroalkylene having one or more —NH— groups;
$R_5$ is hydrogen or alkyl; and
$R_6$ is hydrogen, alkyl, or —(C=NH)—$NH_2$;
$R_7$ is a z-valent radical of an alkane or a z-valent radical of a heteroalkane;
z is an integer in a range of 3 to 10; and
the polymeric sorbent has covalently attached nitrogen-containing groups.
2. The polymeric sorbent of claim 1, wherein the polymerizable composition comprises 15 to 65 weight percent maleic anhydride, 30 to 85 weight percent divinylbenzene, and 0 to 20 weight percent of a styrene-type monomer.
3. The polymeric sorbent of claim 1, wherein the polymerizable composition comprises 25 to 65 weight percent maleic anhydride, 30 to 75 weight percent divinylbenzene, and 1 to 20 weight percent styrene-type monomer.
4. The polymeric sorbent of claim 1, wherein the polymerizable composition comprises 30 to 65 weight percent maleic anhydride, 30 to 70 weight percent divinylbenzene, and 1 to 20 weight percent styrene-type monomer.
5. A method of sorbing a reactive gas on a polymeric sorbent, the method comprising:
a) providing a polymeric sorbent, the polymeric sorbent being a reaction product of a reaction mixture comprising
1) a precursor polymeric material comprising a polymerized product of a polymerizable composition comprising
(a) 8 to 65 weight percent maleic anhydride based on the total weight of monomers in the polymerizable composition;
(b) 30 to 85 weight percent divinylbenzene based on the total weight of monomers in the polymerizable composition; and
(c) 0 to 20 weight percent of a styrene-type monomer based on the total weight of monomers in the polymerizable composition, wherein the styrene-type monomer is styrene, an alkyl-substituted styrene, or a combination thereof; and 2) a nitrogen-containing compound that is selected from ammonia or a compound having at least one primary or secondary amino group, the nitrogen-containing compound being of Formula (IV) or Formula (V)

$$R_3NHR_2 \qquad (IV)$$

$$R_7\text{—}(NHR_2)_z \qquad (V)$$

wherein $R_2$ is hydrogen or an alkyl;

$R_3$ is hydrogen, alkyl, a group of formula —$R_4$—$NR_5R_6$ or —(C=NH)—$NH_2$;

$R_4$ is a covalent bond, an alkylene, an arylene, an aralkylene, a heteroalkylene having one or more oxy (—O—) groups, or a heteroalkylene having one or more —NH— groups;

$R_5$ is hydrogen or alkyl; and $R_6$ is hydrogen, alkyl, or —(C=NH)—$NH_2$;

$R_7$ is a z-valent radical of an alkane or a z-valent radical of a heteroalkane;

z is an integer in a range of 3 to 10; and the polymeric sorbent has covalently attached nitrogen-containing groups; and b) sorbing the reactive gas on the polymeric sorbent, wherein the reactive gas is an acid gas, an acid precursor gas, or both.

6. The method of claim 5, wherein the reactive gas is hydrogen fluoride, fluorine, hydrogen bromide, bromine, hydrogen chloride, chlorine, sulfuric acid, sulfurous acid, hydrogen sulfide, sulfur dioxide, nitric acid, nitrous acid, nitrogen dioxide or mixtures thereof.

7. The method of claim 5, wherein the polymeric sorbent further comprises an acid-base dye and wherein the acid-base dye changes color when the sorption capacity of the polymeric sorbent for the reactive gas is reached or is close to being reached.

8. The method of claim 5, wherein the covalently attached nitrogen-containing group undergoes an acid-base reaction with the reactive gas.

9. The method of claim 5 wherein the polymeric sorbent sorbs an amount of reactive gas in a range of 0.1 to 10 millimoles per gram based on the weight of the polymeric sorbent.

10. A composition comprising:
(a) a polymeric sorbent of claim 1; and
(b) a reactive gas sorbed on the polymeric sorbent, wherein the reactive gas is an acid gas, an acid gas precursor, or both.

11. A method of forming a polymeric sorbent, the method comprising:
(a) providing a precursor polymeric material comprising a polymerized product of a polymerizable composition comprising
  (1) 8 to 65 weight percent maleic anhydride based on the total weight of monomers in the polymerizable composition;
  (2) 30 to 85 weight percent divinylbenzene based on the total weight of monomers in the polymerizable composition; and
  (3) 0 to 20 weight percent of a styrene-type monomer based on the total weight of monomers in the polymerizable composition, wherein the styrene-type monomer is styrene, an alkyl-substituted styrene, or a combination thereof; and
(b) reacting the precursor polymeric material with a nitrogen-containing compound that is selected from ammonia or a compound having at least one primary amino group or at least one secondary amino group, the nitrogen-containing compound being of Formula (IV) or Formula (V)

$$R_3NHR_2 \qquad (IV)$$

$$R_7\text{—}(NHR_2)_z \qquad (V)$$

wherein $R_2$ is hydrogen or an alkyl;

$R_3$ is hydrogen, alkyl, a group of formula —$R_4$—$NR_5R_6$ or —(C=NH)—$NH_2$;

$R_4$ is a covalent bond, an alkylene, an arylene, an aralkylene, a heteroalkylene having one or more oxy (—O—) groups, or a heteroalkylene having one or more —NH— groups;

$R_5$ is hydrogen or alkyl; and $R_6$ is hydrogen, alkyl, or —(C=NH)—$NH_2$;

$R_7$ is a z-valent radical of an alkane or a z-valent radical of a heteroalkane;

z is an integer in a range of 3 to 10; and the polymeric sorbent has covalently attached nitrogen-containing groups.

* * * * *

UNITED STATES PATENT AND TRADEMARK OFFICE
CERTIFICATE OF CORRECTION

PATENT NO. : 10,967,359 B2
APPLICATION NO. : 15/781557
DATED : April 6, 2021
INVENTOR(S) : Michael Wendland et al.

It is certified that error appears in the above-identified patent and that said Letters Patent is hereby corrected as shown below:

In the Specification

Column 27
Line 17, Delete "R" and insert -- $R_4$ --, therefor.
Line 35, Delete "—$R_6N$—" and insert -- —$R_5N$— --, therefor.
Line 45, Delete "—R—$NHR_2$," and insert -- —$R_4$—$NHR_2$, --, therefor.
Line 47, Delete "R" and insert -- $R_4$ --, therefor.
Line 59, Delete "$(NHR_2)^{z-1}$." and insert -- $(NHR_2)_{z-1}$. --, therefor.

Column 31
Line 20, Delete "dimethylethylenediaminee" and insert -- dimethylethylenediamine --, therefor.

In the Claims

Column 38
Line 42, In Claim 2, after "percent" delete "of a".

Column 39
Line 15, In Claim 5, delete "$NR_5R_6$" and insert -- $NR_5R_6$, --, therefor.

Column 40
Line 33, In Claim 11, delete "—$NR_5R_6$" and insert -- —$NR_5R_6$, --, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*